United States Patent
Geng et al.

(10) Patent No.: US 10,536,196 B2
(45) Date of Patent: Jan. 14, 2020

(54) MULTIPLE RESOURCE UNIT ALLOCATION FOR OFDMA WLAN

(71) Applicant: InterDigital Patent Holdings, Inc., Wilmington, DE (US)

(72) Inventors: Chunhua Geng, Irvine, CA (US); Fengjun Xi, San Diego, CA (US); Alphan Sahin, Westbury, NY (US); Rui Yang, Greenlawn, NY (US); Oghenekome Oteri, San Diego, CA (US); Nirav B. Shah, San Diego, CA (US); Robert L. Olesen, Huntington, NY (US); Frank La Sita, Setauket, NY (US)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 0 days.

(21) Appl. No.: 15/758,202

(22) PCT Filed: Sep. 8, 2016

(86) PCT No.: PCT/US2016/050718
§ 371 (c)(1),
(2) Date: Mar. 7, 2018

(87) PCT Pub. No.: WO2017/044591
PCT Pub. Date: Mar. 16, 2017

(65) Prior Publication Data
US 2018/0248591 A1    Aug. 30, 2018

Related U.S. Application Data

(60) Provisional application No. 62/217,440, filed on Sep. 11, 2015.

(51) Int. Cl.
*H04B 7/0413* (2017.01)
*H04L 1/00* (2006.01)
(Continued)

(52) U.S. Cl.
CPC ......... *H04B 7/0413* (2013.01); *H04B 7/0452* (2013.01); *H04L 1/0006* (2013.01);
(Continued)

(58) Field of Classification Search
CPC ....... H04L 1/0618; H04L 1/06; H04L 1/0071; H04L 25/0204; H04L 1/0003;
(Continued)

(56) References Cited

U.S. PATENT DOCUMENTS 7,746,944 B2 * 6/2010 Bacher .................. H04L 1/0003
375/265
8,121,096 B2 * 2/2012 Choi ..................... H04L 1/0067
370/335

(Continued)

FOREIGN PATENT DOCUMENTS

| EP | 2665216 A1 | 11/2013 |
| WO | WO 2016/021941 A1 | 2/2016 |
| WO | WO 2016/054525 A1 | 4/2016 |

OTHER PUBLICATIONS

3GPP TS 36.211, V12.6.0, "3$^{rd}$ Generation Partnership Project; Technical Specification Group Radio Access Network; Evolved Universal Terrestrial Radio Access (E-UTRA), Physical Channels and Modulation (Release 12)" Jun. 2015, 136 pages.

(Continued)

*Primary Examiner* — James M Perez
(74) *Attorney, Agent, or Firm* — Volpe and Koenig, P.C.

(57) ABSTRACT

Systems, methods, and instrumentalities are disclosed for multiple resource unit (RU) allocation for OFDMA WLAN. A transmitter may parse an encoded bit stream into a (Continued)

plurality of spatial streams. The transmitter may determine an allocation of encoded bits of the plurality of spatial streams to a plurality of interleavers. The transmitter may allocate the encoded bits to the plurality of interleavers based on the determined allocation. The allocation of the encoded bits may be determined based on one or more of channel related feedback, an RU configuration associated with the transmission, a quality of service (QoS), and/or traffic priorities. The transmitter may interleave the encoded bits using the plurality of interleavers. The transmitter may combine the interleaved encoded bits from the plurality of interleavers into a sequenced bit stream.

20 Claims, 25 Drawing Sheets

(51) Int. Cl.
    *H04L 1/06* (2006.01)
    *H04L 5/00* (2006.01)
    *H04B 7/0452* (2017.01)
    *H04L 27/26* (2006.01)
    *H04W 84/12* (2009.01)
    *H04W 88/08* (2009.01)
    *H04L 27/34* (2006.01)

(52) U.S. Cl.
    CPC .......... *H04L 1/0058* (2013.01); *H04L 1/0071* (2013.01); *H04L 1/0625* (2013.01); *H04L 5/0023* (2013.01); *H04L 5/0046* (2013.01); *H04L 5/0094* (2013.01); *H04L 1/0003* (2013.01); *H04L 5/006* (2013.01); *H04L 27/26* (2013.01); *H04L 27/2601* (2013.01); *H04L 27/34* (2013.01); *H04W 84/12* (2013.01); *H04W 88/08* (2013.01)

(58) Field of Classification Search
    CPC ... H04L 1/0006; H04L 1/0625; H04L 1/0058; H04L 5/0046; H04L 5/0023; H04L 5/0094; H04L 5/006; H04L 27/34; H04L 27/2601; H04B 7/0669; H04B 7/0413; H04B 7/0452; H04W 84/12; H04W 8/08
    USPC .................................. 375/259–285, 295–315
    See application file for complete search history.

(56) References Cited

U.S. PATENT DOCUMENTS

| | | | | |
|---|---|---|---|---|
| 8,565,326 | B2* | 10/2013 | Kao | H04L 1/0041 375/260 |
| 8,675,794 | B1* | 3/2014 | Perets | H04L 1/0003 375/225 |
| 8,842,622 | B2* | 9/2014 | Zhang | H04B 7/024 370/329 |
| 8,989,299 | B2* | 3/2015 | Zhou | H04B 7/0639 375/285 |
| 9,191,080 | B2* | 11/2015 | Yokomakura | H04L 1/0071 |
| 9,338,691 | B2* | 5/2016 | Kim | H04L 1/004 |
| 9,680,603 | B2* | 6/2017 | Azizi | H04L 1/0057 |
| 9,832,059 | B2* | 11/2017 | Zhang | H04L 5/0048 |
| 9,844,028 | B2* | 12/2017 | Yang | H04L 1/0041 |
| 9,867,174 | B2* | 1/2018 | Zhang | H04B 7/024 |
| 10,110,406 | B2* | 10/2018 | Yang | H04L 5/0023 |
| 10,149,286 | B2* | 12/2018 | Koorapaty | H04L 1/0009 |
| 10,200,228 | B2* | 2/2019 | Wu | H04L 1/0071 |
| 10,374,765 | B2* | 8/2019 | Manolakos | H04L 27/2626 |
| 2007/0291868 | A1* | 12/2007 | Olesen | H04B 7/0434 375/267 |
| 2010/0008438 | A1* | 1/2010 | Kao | H04L 1/0041 375/261 |
| 2010/0166111 | A1* | 7/2010 | Park | H04L 1/0068 375/298 |
| 2010/0309834 | A1* | 12/2010 | Fischer | H04B 7/0452 370/312 |
| 2011/0002219 | A1* | 1/2011 | Kim | H04B 7/0417 370/203 |
| 2011/0110349 | A1* | 5/2011 | Grandhi | H04W 28/18 370/338 |
| 2011/0274123 | A1* | 11/2011 | Hammarwall | H04L 1/003 370/479 |
| 2012/0113831 | A1* | 5/2012 | Pelletier | H04L 5/0053 370/252 |
| 2012/0176884 | A1* | 7/2012 | Zhang | H04B 7/024 370/203 |
| 2013/0301555 | A1* | 11/2013 | Porat | H04L 1/0059 370/329 |
| 2015/0326351 | A1* | 11/2015 | Kim | H04L 1/0071 375/219 |
| 2015/0349995 | A1* | 12/2015 | Zhang | H04L 5/0048 375/295 |
| 2015/0365195 | A1* | 12/2015 | Yang | H04L 27/2634 375/295 |
| 2016/0029397 | A1* | 1/2016 | Chen | H04L 1/0057 370/329 |
| 2016/0050666 | A1* | 2/2016 | Yang | H04W 72/02 370/329 |
| 2016/0080043 | A1* | 3/2016 | Tian | H04B 7/022 375/267 |
| 2016/0080191 | A1* | 3/2016 | Porat | H04L 1/0059 370/329 |
| 2016/0142187 | A1* | 5/2016 | Yang | H04L 27/2602 370/328 |
| 2016/0165574 | A1* | 6/2016 | Chu | H04L 5/0007 370/312 |
| 2016/0183224 | A1* | 6/2016 | Rebeiz | H04L 5/0092 370/329 |
| 2016/0254884 | A1* | 9/2016 | Hedayat | H04B 7/0413 370/329 |
| 2016/0323426 | A1* | 11/2016 | Hedayat | H04W 28/0268 |
| 2017/0041825 | A1* | 2/2017 | Yang | H04W 28/065 |
| 2017/0104553 | A1* | 4/2017 | Liu | H04L 1/0041 |
| 2017/0180177 | A1* | 6/2017 | Wu | H04L 1/0071 |
| 2017/0230952 | A1* | 8/2017 | Choi | H04W 72/04 |
| 2017/0273083 | A1* | 9/2017 | Chen | H04L 1/0041 |
| 2017/0317868 | A1* | 11/2017 | Lin | H04L 27/26 |
| 2018/0006791 | A1* | 1/2018 | Marinier | H04L 1/0026 |
| 2018/0062899 | A1* | 3/2018 | Zhang | H04L 5/0048 |
| 2018/0167181 | A1* | 6/2018 | Montreuil | H04L 5/00 |
| 2018/0205442 | A1* | 7/2018 | Oteri | H04B 7/0417 |
| 2018/0248591 | A1* | 8/2018 | Geng | H04B 7/0452 |
| 2018/0278308 | A1* | 9/2018 | Jin | H04B 7/0617 |
| 2019/0036642 | A1* | 1/2019 | Huang | H04B 7/068 |
| 2019/0124719 | A1* | 4/2019 | Park | H04W 72/048 |

OTHER PUBLICATIONS

Aboul-Magd, Osama, "802.11 HEW SG Proposed PAR", IEEE 802.11-14/0165r1, IEEE P802.11 Wireless LANs, Mar. 2014, 6 pages.

Aboul-Magd, Osama, "IEEE 802.11 HEW SG Proposed CSD", IEEE 802.11-14/0169r1, IEEE P802.11 Wireless LANs, Mar. 2014, 6 pages.

Azizi et al., "OFDMA Numerology and Structure", IEEE 802.11-15/0330r5, May 13, 2015, 50 pages.

Chen et al., "MAC and PHY Proposal for 802.11af", IEEE 802.11-10/0258r0, Mar. 2010, 23 pages.

Halasz, Dave, "Sub 1 GHz license-exempt PAR and 5C", IEEE 802.11-10/0001r7, IEEE P802.11 Wireless LANs, Jul. 2010, 8 pages.

IEEE, "11ax Coding Discussions", IEEE 802.11-15/580r1, Jul. 2015, 14 pages.

IEEE, "Draft Standard for Information Technology—Telecommunications and Information Exchange Between Systems—Local and Metropolitan Area Networks—Specific Requirements" Part 11: Wireless LAN Medium Access Control (MAC) and Physical Layer

(56) References Cited

OTHER PUBLICATIONS (PHY) Specifications: Amendment 4(# 933): Enhancements for Higher Throughput, IEEE P802.11 n ™/02.05, Jul. 2007, 494 pages.
IEEE, "Part 11: Wireless LAN Medium Access Control (MAC) and Physical Layer (PHY) Specifications—Amendment 5: Enhancements for Very High Throughput for Operation in Bands below 6 GHz", IEEE P802.11ac™/D1.0, May 2011, 263 pages.
IEEE, "Part 11: Wireless LAN Medium Access Control (MAC) and Physical Layer (PHY) Specifications", IEEE Std 802.11™-2012, Mar. 29, 2012, 2793 pages.
IEEE, "Specification Framework for TGax", IEEE 802.11-15/0132r5, May 2015.
Josiam et al., "Analysis on Multiplexing Schemes Exploiting Frequency Selectivity in WLAN Systems", IEEE 11-10/0858r1, Jul. 2014, 18 pages.
Oteri et al., "Frequency Selective Scheduling (FSS) for TGax OFDMA", IEEE 802.11-15/568r2, May 11, 2015, 21 pages.
Park, Minyoung, "Proposed Specification Framework for TGah", IEEE 802.11- 11/1137r6, IEEE P802.11 Wireless LANs, Mar. 2012, 13 pages.
Perahia et al., "HEW Usage Scenarios and Applications", IEEE 802.11-13/0514r0, May 2013, 23 pages.
Sun et al., "Interleaver and Tone Mapper for OFDMA", IEEE 802.11-15/0816r0, Jul. 2015, 35 pages.
Tayamon et al., "Impact of Number of Sub-Channels in OFDMA", IEEE 802.11- 15/0383r0, Mar. 2015, 21 pages.
Wong et al., "Proposed TGah Draft Amendment", IEEE 802.11-13/0500r1, IEEE P802.11 Wireless LANs, May 5, 2013, 330 pages.
Wu et al., "OFDMA Performance Analysis", IEEE 802.11-14/1227r2, Sep. 2014, 11 pages.
Aboul-Magd, "802.11 HEW SG Proposed PAR," IEEE 802.11-14/0165r0 (Jan. 22, 2014).
Aboul-Magd, "IEEE 802.11 HEW SG Proposed CSD," IEEE 802.11-14/0169r0 (Jan. 22, 2014).
Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 6: Enhancments for High Efficiency WLAN, IEEE P802.11ax/D0.3 (Aug. 2016).
Halasz, "Sub 1 GHz license-exempt PAR and 5C," IEEE P802.11 Wireless LANs, IEEE 802.11-10/0001r13 (Jul. 2010).
IEEE P802.11ah/D5.0, Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 6: Sub 1 GHz License Exempt Operation, IEEE P802.11ah/D5.0 (Mar. 2015).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).
IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHz, IEEE Std 802.11ac-2013 (Dec. 11, 2013).
Stacey, "Specification Framework for TGax," IEEE 802.11-15/0132r8 (sic) (Sep. 22, 2015). (Reference contains error on facepage—proper citation is (IEEE 802.11-15/0132r9).
Third Generation Partnership Project, "Technical Specification Group Radio Access Network; Evolved Universal Terrestrial Radio Access (E-UTRA); Physical channels and modulation (Release 12)," 3GPP TS 36.211 V12.8.0 (Dec. 2015).
Third Generation Partnership Project, "Technical Technical Specification Group Radio Access Network; Evolved Universal Terrestrial Radio Access (E-UTRA); Physical channels and modulation (Release 13)," 3GPP TS 36.211 V13.2.0 (Jun. 2016).

\* cited by examiner

_600_

| RU (tones) | BCC | | | LDPC |
|---|---|---|---|---|
| | $N_{cw}$ | | $N_{es}$ | $D_{BM}$ |
| 26 | 8 | | 2 | 1 |
| 52 | 16 | | 11 | 3 |
| 106 | 17 | | 29 | 6 |
| 242 | 26 | | 58 | 9 |
| 484 | | | | 12 |
| 996 | | | | 20 |

FIG. 6

MULTIPLE RESOURCE UNIT ALLOCATION FOR OFDMA WLAN

CROSS-REFERENCE TO RELATED APPLICATIONS

This application is the National Stage Entry under 35 U.S.C. § 371 of Patent Cooperation Treaty Application No. PCT/US2016/050718, filed Sep. 8, 2016, which claims priority to U.S. provisional patent application No. 62/217,440, filed Sep. 11, 2015, which are incorporated herein by reference in their entirety.

BACKGROUND

A Wireless Local Area Network (WLAN) may have multiple modes of operation, such as an Infrastructure Basic Service Set (BSS) mode and an Independent BSS (IBSS) mode. A WLAN in Infrastructure BSS mode may have an Access Point (AP) for the BSS. One or more wireless transmit receive units (WTRUs), e.g., stations (STAs), may be associated with an AP. An AP may have access or an interface to a Distribution System (DS) or other type of wired/wireless network that carries traffic in and out of a BSS. Traffic to STAs that originates from outside a BSS may arrive through an AP, which may deliver the traffic to the STAs.

SUMMARY

Systems, methods, and instrumentalities are disclosed for multiple resource unit (RU) allocation for OFDMA WLAN. A transmitter may parse an encoded bit stream into a plurality of spatial streams. The transmitter may be a network device, such as an access point (AP) that includes a memory, a transceiver, and a processor. The encoded bit stream may be associated with a transmission to a station (STA). The encoded bit stream may be parsed based on resource unit (RU) size. The transmitter may determine an allocation of encoded bits of the plurality of spatial streams to a plurality of interleavers. The allocation of encoded bits may be based on a RU configuration. Each of the plurality of interleavers may be associated with one or more RUs of multiple RUs associated with the transmission. The multiple RUs may be non-contiguous and/or unequal in size. The transmitter may allocate the encoded bits to the plurality of interleavers based on the determined allocation. The allocation of the encoded bits may be determined based on one or more of channel related feedback, an RU configuration associated with the transmission, a quality of service (QoS), and/or traffic priorities. The transmitter may interleave the encoded bits using the plurality of interleavers. The transmitter may combine the interleaved encoded bits from the plurality of interleavers into a sequenced bit stream. The plurality of interleavers used for the transmission may be equal to an amount of the multiple RUs allocated for the transmission. Each of the plurality of interleavers may correspond to a corresponding RU of the multiple RUs. The transmitter may send the transmission to the STA.

The transmitter may determine one or more modulation and coding schemes (MCSs) for the multiple RUs. The transmitter may map the encoded bits of the plurality of spatial streams to one or more constellation points. The transmitter may map the encoded bits based on the one or more determined MCSs. The transmitter may determine a multiple input multiple output (MIMO) scheme for each RU of the multiple RUs. The transmitter may determine a space-time code (e.g., a space-time block code) based on the determined MIMO scheme for each RU. The transmitter may spread the one or more constellation points from the plurality of spatial streams into a plurality of space-time streams, for example, using the space-time code. The transmitter may map the plurality of space-time streams to a plurality of transmit chains. The transmitter may determine which RU of the multiple RUs should be used for each transmitting antenna. The transmitter may allocate, to the STA based on the RU determination, the encoded bits to one or more RUs of the multiple RUs.

BRIEF DESCRIPTION OF THE DRAWINGS

FIG. 6 shows an example interleaver design and tone mapper design for OFDMA.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

Figure 1A:
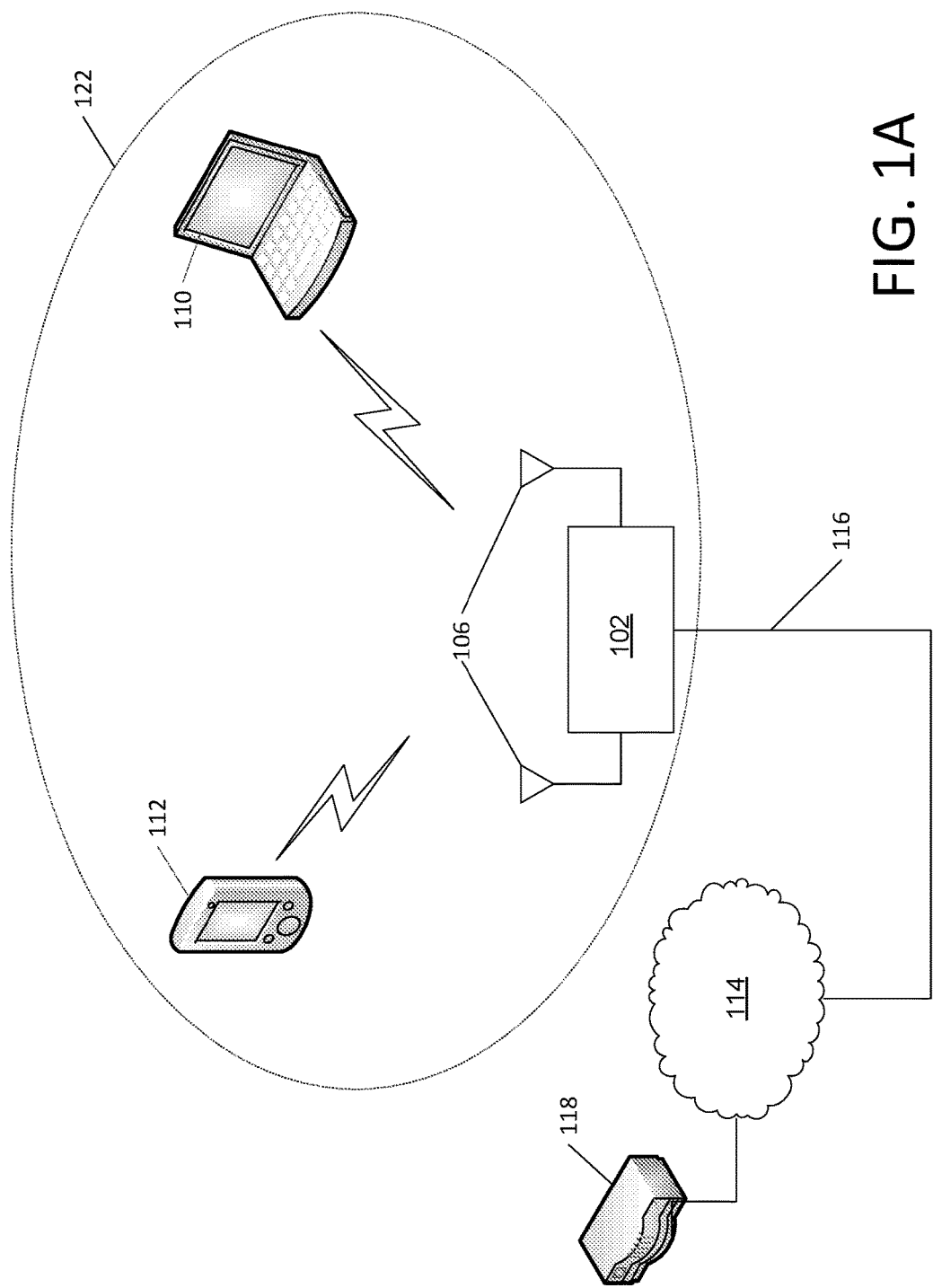
FIG. 1A illustrates exemplary wireless local area network (WLAN) devices.

FIG. 1A illustrates exemplary wireless local area network (WLAN) devices. One or more of the devices may be used to implement one or more of the features described herein. The WLAN may include, but is not limited to, access point (AP) 102, station (STA) 110, and STA 112. STA 110 and 112 may be associated with AP 102. The WLAN may be configured to implement one or more protocols of the IEEE 802.11 communication standard, which may include a channel access scheme, such as DSSS, OFDM, OFDMA, etc. A WLAN may operate in a mode, e.g., an infrastructure mode, an ad-hoc mode, etc.

A WLAN operating in an infrastructure mode may comprise one or more APs communicating with one or more associated STAs. An AP and STA(s) associated with the AP may comprise a basic service set (BSS). For example, AP 102, STA 110, and STA 112 may comprise BSS 122. An extended service set (ESS) may comprise one or more APs (with one or more BSSs) and STA(s) associated with the APs. An AP may have access to, and/or interface to, distribution system (DS) 116, which may be wired and/or wireless and may carry traffic to and/or from the AP. Traffic to a STA in the WLAN originating from outside the WLAN may be received at an AP in the WLAN, which may send the traffic to the STA in the WLAN. Traffic originating from a STA in the WLAN to a destination outside the WLAN, e.g., to server 118, may be sent to an AP in the WLAN, which may send the traffic to the destination, e.g., via DS 116 to network 114 to be sent to server 118. Traffic between STAs within the WLAN may be sent through one or more APs. For example, a source STA (e.g., STA 110) may have traffic intended for a destination STA (e.g., STA 112). STA 110 may send the traffic to AP 102, and, AP 102 may send the traffic to STA 112.

A WLAN may operate in an ad-hoc mode. The ad-hoc mode WLAN may be referred to as independent basic service set (IBBS). In an ad-hoc mode WLAN, the STAs may communicate directly with each other (e.g., STA 110 may communicate with STA 112 without such communication being routed through an AP).

IEEE 802.11 devices (e.g., IEEE 802.11 APs in a BSS) may use beacon frames to announce the existence of a WLAN network. An AP, such as AP 102, may transmit a beacon on a channel, e.g., a fixed channel, such as a primary channel. A STA may use a channel, such as the primary channel, to establish a connection with an AP.

STA(s) and/or AP(s) may use a Carrier Sense Multiple Access with Collision Avoidance (CSMA/CA) channel access mechanism. In CSMA/CA a STA and/or an AP may sense the primary channel. For example, if a STA has data to send, the STA may sense the primary channel. If the primary channel is detected to be busy, the STA may back off. For example, a WLAN or portion thereof may be configured so that one STA may transmit at a given time, e.g., in a given BSS. Channel access may include RTS and/or CTS signaling. For example, an exchange of a request to send (RTS) frame may be transmitted by a sending device and a clear to send (CTS) frame that may be sent by a receiving device. For example, if an AP has data to send to a STA, the AP may send an RTS frame to the STA. If the STA is ready to receive data, the STA may respond with a CTS frame. The CTS frame may include a time value that may alert other STAs to hold off from accessing the medium while the AP initiating the RTS may transmit its data. On receiving the CTS frame from the STA, the AP may send the data to the STA.

A device may reserve spectrum via a network allocation vector (NAV) field. For example, in an IEEE 802.11 frame, the NAV field may be used to reserve a channel for a time period. A STA that wants to transmit data may set the NAV to the time for which it may expect to use the channel. When a STA sets the NAV, the NAV may be set for an associated WLAN or subset thereof (e.g., a BSS). Other STAs may count down the NAV to zero. When the counter reaches a value of zero, the NAV functionality may indicate to the other STA that the channel is now available.

The devices in a WLAN, such as an AP or STA, may include one or more of the following: a processor, a memory, a radio receiver and/or transmitter (e.g., which may be combined in a transceiver), one or more antennas (e.g., antennas 106 in FIG. 1A), etc. A processor function may comprise one or more processors. For example, the processor may comprise one or more of: a general purpose processor, a special purpose processor (e.g., a baseband processor, a MAC processor, etc.), a digital signal processor (DSP), Application Specific Integrated Circuits (ASICs), Field Programmable Gate Array (FPGAs) circuits, any other type of integrated circuit (IC), a state machine, and the like. The one or more processors may be integrated or not integrated with each other. The processor (e.g., the one or more processors or a subset thereof) may be integrated with one or more other functions (e.g., other functions such as memory). The processor may perform signal coding, data processing, power control, input/output processing, modulation, demodulation, and/or any other functionality that may enable the device to operate in a wireless environment, such as the WLAN of FIG. 1A. The processor may be configured to execute processor executable code (e.g., instructions) including, for example, software and/or firmware instructions. For example, the processor may be configured to execute computer readable instructions included on one or more of the processor (e.g., a chipset that includes memory and a processor) or memory. Execution of the instructions may cause the device to perform one or more of the functions described herein.

A device may include one or more antennas. The device may employ multiple input multiple output (MIMO) techniques. The one or more antennas may receive a radio signal. The processor may receive the radio signal, e.g., via the one or more antennas. The one or more antennas may transmit a radio signal (e.g., based on a signal sent from the processor).

The device may have a memory that may include one or more devices for storing programming and/or data, such as processor executable code or instructions (e.g., software, firmware, etc.), electronic data, databases, or other digital information. The memory may include one or more memory units. One or more memory units may be integrated with one or more other functions (e.g., other functions included in the device, such as the processor). The memory may include a read-only memory (ROM) (e.g., erasable programmable read only memory (EPROM), electrically erasable programmable read only memory (EEPROM), etc.), random access memory (RAM), magnetic disk storage media, optical storage media, flash memory devices, and/or other non-transitory computer-readable media for storing information. The memory may be coupled to the processor. The processor may communicate with one or more entities of memory, e.g., via a system bus, directly, etc.

Figure 1B:
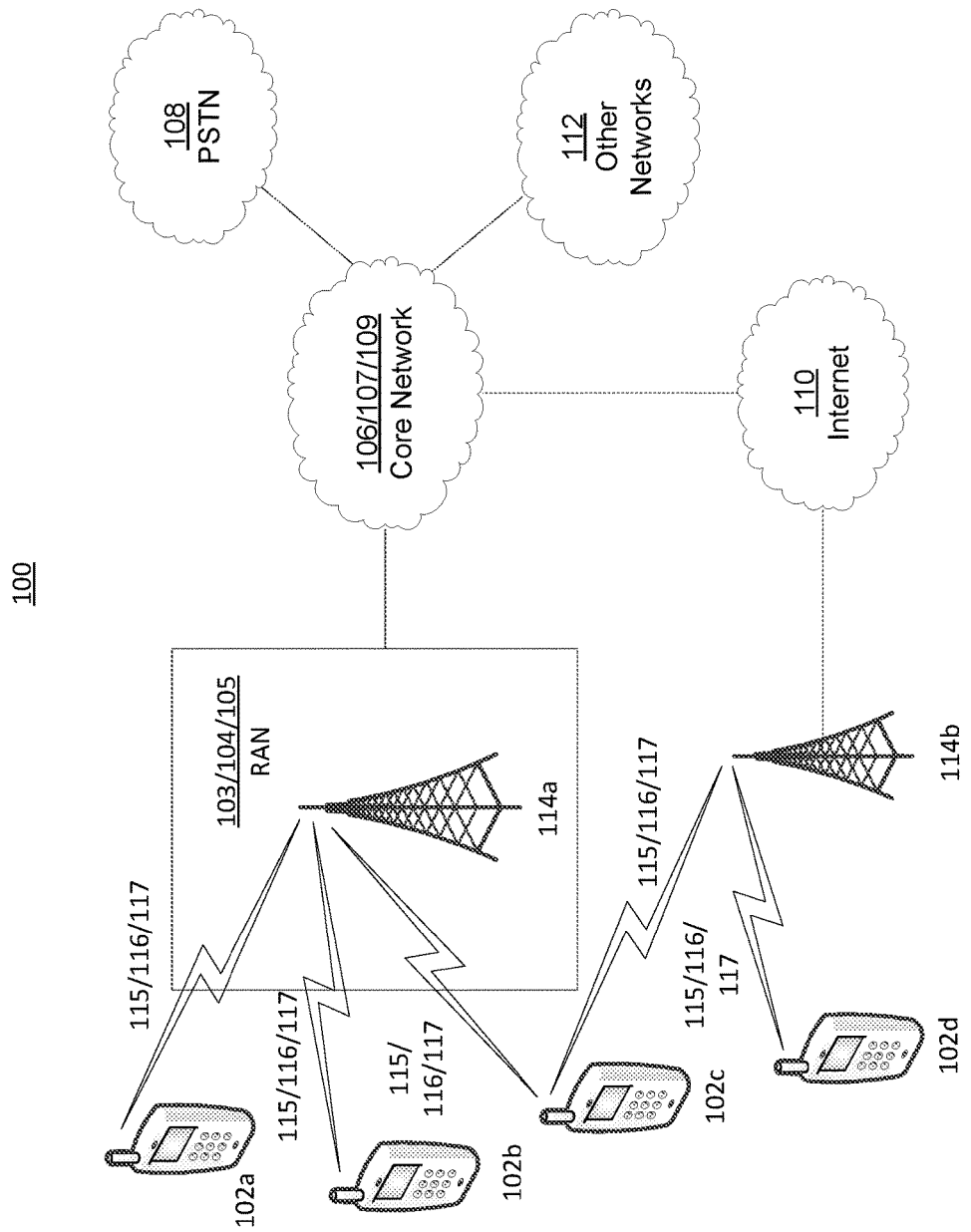
FIG. 1B is a diagram of an example communications system in which one or more disclosed features may be implemented.

FIG. 1B is a diagram of an example communications system 100 in which one or more disclosed features may be implemented. For example, a wireless network (e.g., a wireless network comprising one or more components of the communications system 100) may be configured such that bearers that extend beyond the wireless network (e.g., beyond a walled garden associated with the wireless network) may be assigned QoS characteristics.

The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1B, the communications system 100 may include at least one wireless transmit/receive unit (WTRU), such as a plurality of WTRUs, for instance WTRUs 102a, 102b, 102c, and 102d, a radio access network (RAN) 104, a core network 106, a public switched telephone network (PSTN) 108, the Internet 110, and other networks 112, though it should be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station (e.g., a WLAN STA), a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it should be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1B may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1B, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1B, it should be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1B may be configured to communicate with the base station 114a, which may employ a cellular-based radio technology, and with the base station 114b, which may employ an IEEE 802 radio technology.

Figure 1C:
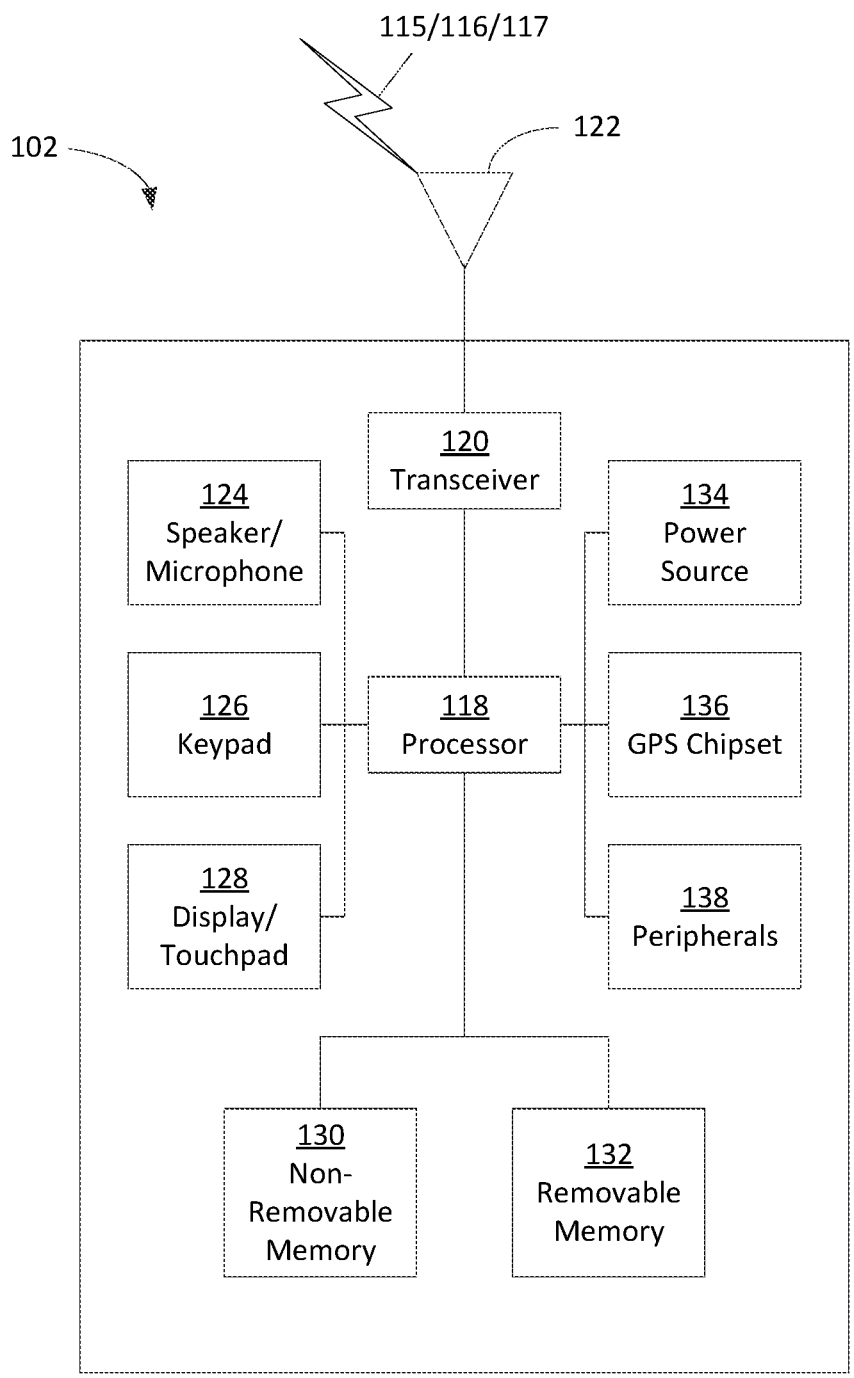
FIG. 1C depicts an exemplary wireless transmit/receive unit, WTRU.

FIG. 1C depicts an exemplary wireless transmit/receive unit, WTRU 102. A WTRU may be a user equipment (UE), a mobile station, a WLAN STA, a fixed or mobile subscriber unit, a pager, a cellular telephone, a personal digital assistant (PDA), a smartphone, a laptop, a netbook, a personal computer, a wireless sensor, consumer electronics, and the like. WTRU 102 may be used in one or more of the communications systems described herein. As shown in FIG. 1C, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It should be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1C depicts the processor 118 and the transceiver 120 as separate components, it should be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It should be appreciated that the transmit/receive element 122 may be configured to transmit and/or receive any combination of wireless signals.

In addition, although the transmit/receive element 122 is depicted in FIG. 1C as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It should be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Systems, methods, and instrumentalities are disclosed for unified feedback for OFDMA WLAN. Unified feedback may be provided by per-RU-based MCS feedback, per-RU-based CSI feedback and/or feedback with symmetric RU allocation.

A Wireless Local Area Network (WLAN) may have multiple modes of operation, such as an Infrastructure Basic Service Set (BSS) mode and an Independent BSS (IBSS) mode. A WLAN in Infrastructure BSS mode may have an Access Point (AP) for the BSS. One or more stations (STAs) may be associated with an AP. An AP may have access or an interface to a Distribution System (DS) or other type of wired/wireless network that carries traffic in and out of a BSS. Traffic to STAs that originates from outside a BSS may arrive through an AP, which may deliver the traffic to the STAs. Traffic originating from STAs to destinations outside a BSS may be sent to an AP, which may deliver the traffic to respective destinations. Traffic between STAs within a BSS may be sent through an AP, e.g., from a source STA to the AP and from the AP to the destination STA. Traffic between STAs within a BSS may be peer-to-peer traffic. Peer-to-peer traffic may be sent directly between the source and destination STAs, for example, with a direct link setup (DLS) using an 802.11e DLS or an 802.11z tunneled DLS (TDLS). A WLAN in Independent BSS (IBSS) mode may not have an AP, and, STAs may communicate directly with each other. An IBSS mode of communication may be referred to as an "ad-hoc" mode of communication.

An AP may transmit a beacon on a fixed channel (e.g. a primary channel), for example, in an 802.11ac infrastructure mode of operation. A channel may be, for example, 20 MHz wide. A channel may be an operating channel of a BSS. A channel may be used by STAs, for example, to establish a connection with an AP. A channel access mechanism in an 802.11 system is Carrier Sense Multiple Access with Collision Avoidance (CSMA/CA). An STA, including an AP, may sense a primary channel, for example, in a CSMA/CA mode of operation. An STA may back off, for example, when a channel is detected to be busy so that only one STA may transmit at a time in a given BSS.

High Throughput (HT) STAs may use, for example, a 40 MHz wide channel for communication, e.g., in 802.11n. A primary 20 MHz channel may be combined with an adjacent 20 MHz channel to form a 40 MHz wide contiguous channel.

Very High Throughput (VHT) STAs may support, for example, 20 MHz, 40 MHz, 80 MHz and 160 MHz wide channels, e.g., in 802.11ac. 40 MHz and 80 MHz channels may be formed, for example, by combining contiguous 20 MHz channels. A 160 MHz channel may be formed, for example, by combining eight contiguous 20 MHz channels or by combining two non-contiguous 80 MHz channels, which may be referred to as an 80+80 configuration. An 80+80 configuration may be passed through a segment parser that divides data into two streams, for example, after channel encoding. Inverse Fast Fourier Transform (IFFT) and time domain processing may be performed, for example, on each stream separately. Streams may be mapped onto two channels. Data may be transmitted on the two channels. A receiver may reverse a transmitter mechanism. A receiver may recombine data transmitted on multiple channels. Recombined data may be sent to Media Access Control (MAC).

Sub-GHz (e.g. MHz) modes of operation may be supported, for example, by 802.11af and 802.11ah. Channel operating bandwidths and carriers may be reduced, for example, relative bandwidths and carriers used in 802.11n and 802.11ac. 802.11af may support, for example, 5 MHz, 10 MHz and 20 MHz bandwidths in a TV White Space (TVWS) spectrum. 802.11ah may support, for example, 1 MHz, 2 MHz, 4 MHz, 8 MHz and 16 MHz bandwidths in non-TVWS spectrum. An example of a use case for 802.11ah may be support for Meter Type Control (MTC) devices in a macro coverage area. MTC devices may have limited capabilities (e.g. limited bandwidths) and may be designed to have a very long battery life.

WLAN systems (e.g. 802.11n, 802.11ac, 802.11af and 802.11ah systems) may support multiple channels and channel widths, such as a channel designated as a primary channel. A primary channel may, for example, have a bandwidth equal to the largest common operating bandwidth supported by STAs in a BSS. Bandwidth of a primary channel may be limited by an STA that supports the smallest bandwidth operating mode. In an example of 802.11ah, a primary channel may be 1 MHz wide, for example, when there are one or more STAs (e.g. MTC type devices) that support a 1 MHz mode while an AP and other STAs support a 2 MHz, 4 MHz, 8 MHz, 16 MHz or other channel bandwidth operating modes. Carrier sensing and NAV settings may depend on the status of a primary channel. As an example, all available frequency bands may be considered busy and remain idle despite being available, for example, when a primary channel has a busy status due to an STA that supports a 1 MHz operating mode transmitting to an AP on the primary channel.

Available frequency bands may vary between different regions. As an example, in the United States, available frequency bands used by 802.11ah may be 902 MHz to 928 MHz in the United States, 917.5 MHz to 923.5 MHz in Korea and 916.5 MHz to 927.5 MHz in Japan. Total bandwidth available may vary between different regions. As an example, the total bandwidth available for 802.11ah may be 6 MHz to 26 MHz depending on the country code.

Spectral efficiency may be improved, for example, by downlink Multi-User Multiple-Input/Multiple-Output (MU-MIMO) transmission to multiple STAs in the same symbol's time frame, e.g., during a downlink OFDM symbol. Downlink MU-MIMO may be implemented, for example, in 802.11ac and 802.11ah. Interference of waveform transmissions to multiple STAs may be avoided, for example, when downlink MU-MIMO uses the same symbol timing to multiple STAs. Operating bandwidth of a MU-MIMO transmission may be limited to the smallest channel bandwidth supported by STAs in a MU-MIMO transmission with an AP, for example, when STAs involved in a MU-MIMO transmission with an AP use the same channel or band.

IEEE 802.11™ High Efficiency WLAN (HEW), which may be referred to as HE, may enhance the quality of service (QoS) experienced by wireless users in many usage scenarios, such as high-density deployments of APs and STAs in 2.4 GHz and 5 GHz bands. HEW Radio Resource Management (RRM) technologies may support a variety of applications or usage scenarios, such as data delivery for stadium events, high user density scenarios such as train stations or enterprise/retail environments, video delivery and wireless services for medical applications. HEW may be implemented, for example, in IEEE 802.11ax.

Short packets, which may be generated by network applications, may be applicable in a variety of applications, such as virtual office, TPC acknowledge (ACK), Video streaming ACK, device/controller (e.g. mice, keyboards, game controls), access (e.g. probe request/response), network selection (e.g. probe requests, Access Network Query Protocol (ANQP)) and network management (e.g. control frames).

MU features, such as uplink (UL) and downlink (DL) Orthogonal Frequency-Division Multiple Access (OFDMA) and UL and DL MU-MIMO, may be implemented in 802.11ax. OFDMA may exploit channel selectivity, for example, to improve or maximize frequency selective multiplexing gain in dense network conditions. A mechanism may be designed and defined for feedback, for example, to enable fast link adaptation, frequency selective scheduling and resource unit based feedback.

OFDMA numerology for HEW may be provided. OFDMA building blocks may be, for example, 20 MHz, 40 MHz and 80 MHz.

Figure 2:
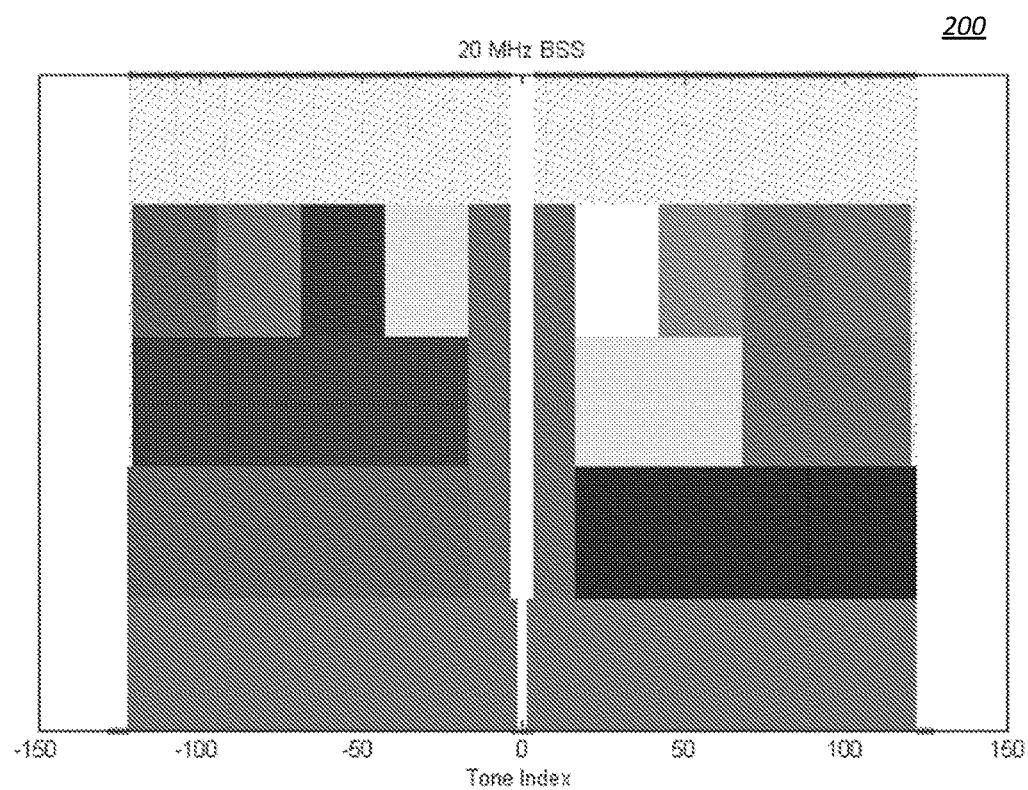
FIG. 2 shows an example of OFDMA numerology for a 20 MHz building block.

FIG. 2 is an example of OFDMA numerology 200 for a 20 MHz building block. A 20 MHz OFDMA building block may be defined, for example, as 26-tone with 2 pilots, 52-tone with 4 pilots and 106-tone with 4 pilots. As an example, there may be 7 DC Nulls and (6,5) guard tones (e.g., 6 guard tones on the left hand side and 5 guard tones on the right hand side), for example, at locations shown in FIG. 2. An OFDMA PPDU may carry a mix of different tone unit sizes within a 242 tone unit boundary.

Figure 3:
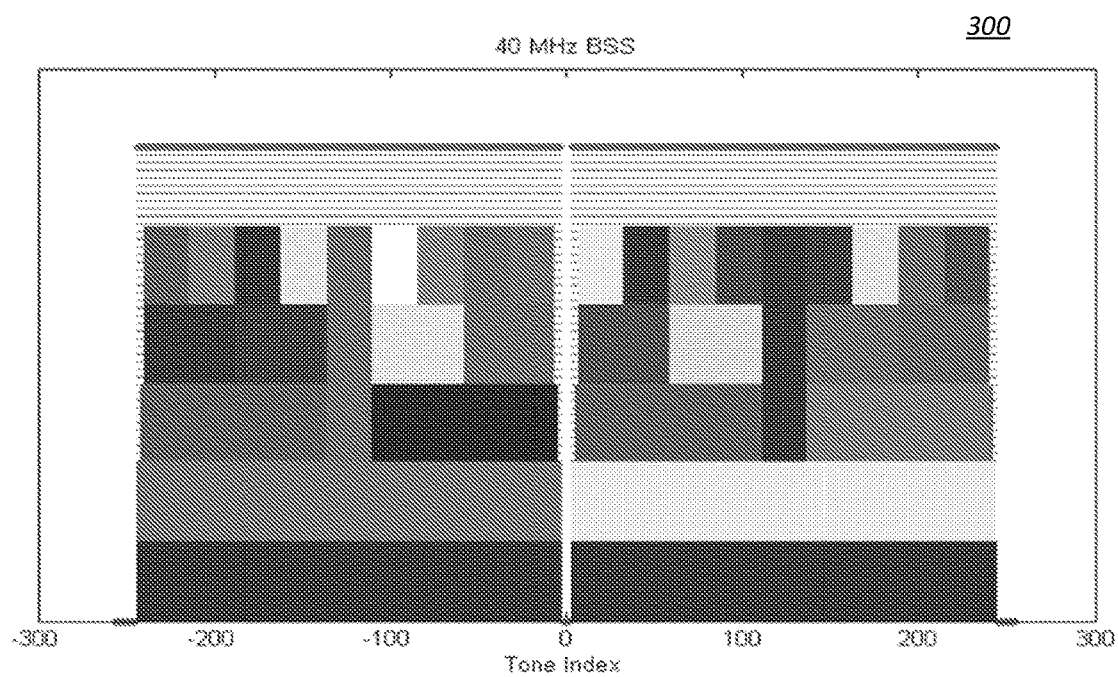
FIG. 3 shows an example of OFDMA numerology for a 40 MHz building block.

FIG. 3 is an example of OFDMA numerology 300 for a 40 MHz building block. A 40 MHz OFDMA building block may be defined, for example, as 26-tone with 2 pilots, 52-tone with 4 pilots, 106-tone with 4 pilots and 242-tone with 8 pilots. As an example, there may be 5 DC Nulls and (12,11) guard tones, for example, at locations shown in FIG. 3.

Figure 4:
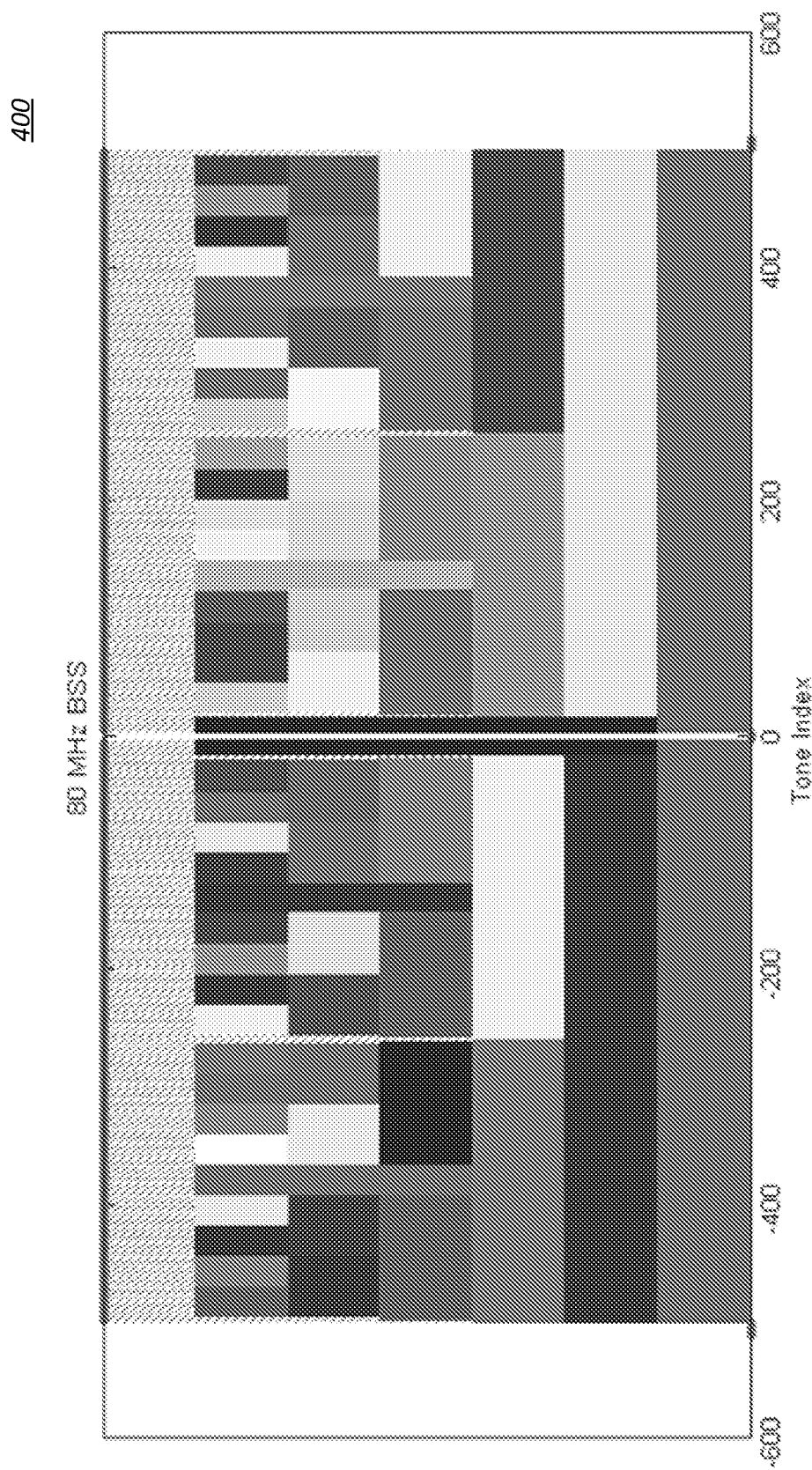
FIG. 4 shows an example of OFDMA numerology for an 80 MHz building block.

FIG. 4 is an example of OFDMA numerology 400 for an 80 MHz building block. An 80 MHz OFDMA building block may be defined, for example, as 26-tone with 2 pilots, 52-tone with 4 pilots, 106-tone with 4 pilots, 242-tone with 8 pilots and 484-tone with 16 pilots. As an example, there may be 7 DC Nulls and (12,11) guard tones, for example, at locations shown in FIG. 4.

Figure 5:
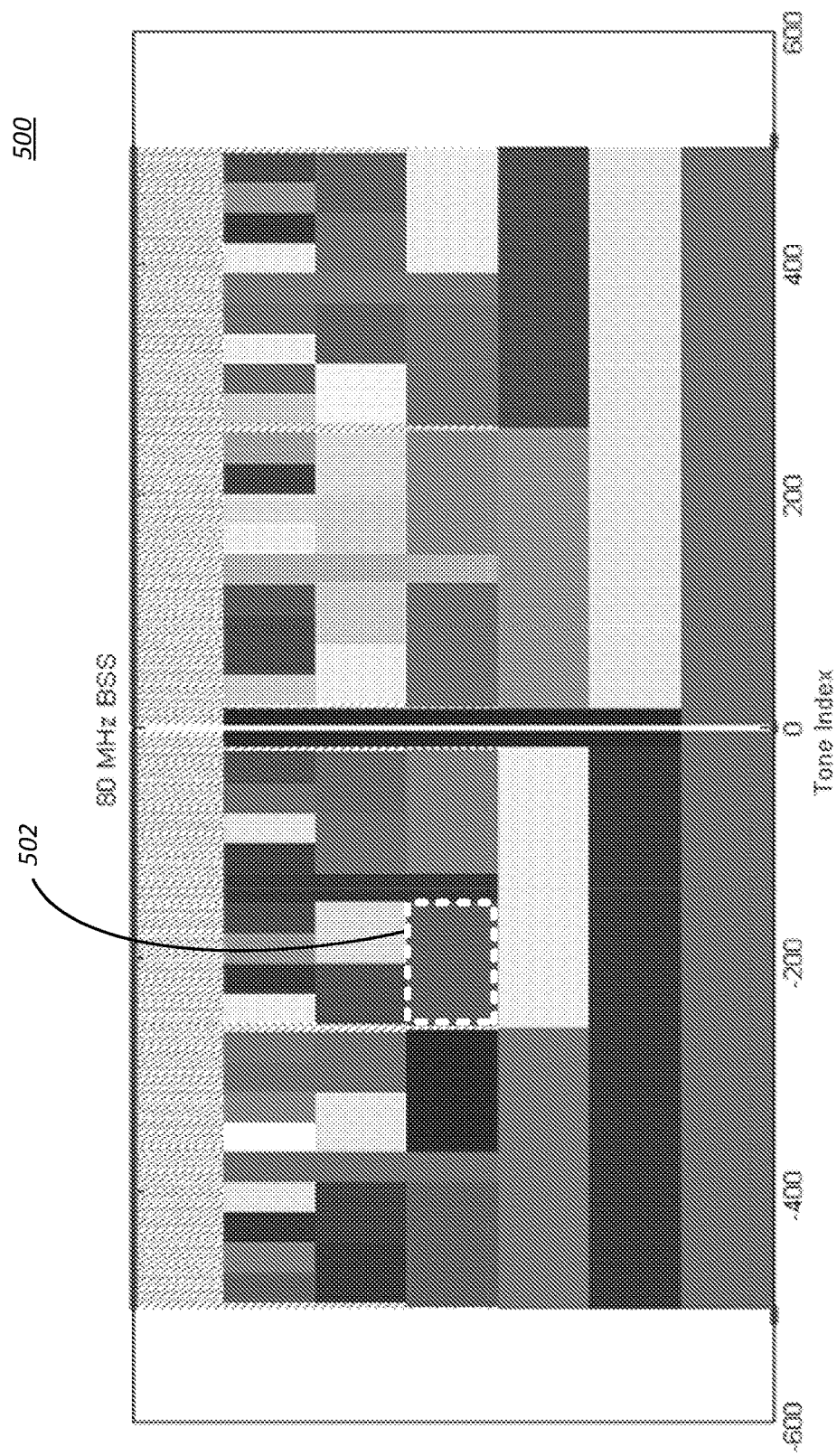
FIG. 5 shows an example of OFDMA numerology for an 80 MHz building block highlighting a resource unit (RU).

FIG. 5 is an example of a Resource Unit (RU) 502 in an example OFDMA numerology 500 for an 80 MHz building block. A RU (e.g., such as RU 502) may include a collection of frequency resources. A frequency resource may include one or more subcarriers and/or one or more tones. The collection of frequency resources may include time and/or space allocations. A RU may be determined based on (e.g., to account for) a minimum feedback granularity of less than a particular bandwidth, such as 20 MHz for example. A RU may include one or more tones that are allocated over a particular space/frequency block of the OFDMA numerology.

FIG. 6 is an example interleaver and tone mapper for OFDMA 600, e.g., for TGax.

IEEE 802.11 may support MCS feedback and/or CSI feedback. In MCS feedback, a STA may send back MCS, SNR and/or a number of space time streams (N_STS). The STA may send the MCS, SNR, and/or N_STS unsolicited or based on a request. In CSI feedback, the STA may send back explicit feedback of a channel. The explicit feedback may include one or more coefficients. For example, the explicit feedback may include one or more of actual channel coefficients, non-compressed BF coefficients, compressed BF coefficients, or STS SNR. The one or more coefficients may be compressed based on a Givens rotation.

CSI feedback in IEEE 802.11 TGax may allow for a minimum feedback granularity of less than 20 MHz.

Interleaver design for multiple RU allocation may be provided. The interleaver design may include a plurality of interleavers. OFDMA RU sizes (e.g., 802.11ax OFDMA RU sizes) may include one or more of: 26, 52, 106, 242, 484, or 996×½ tones. If one RU is allocated (e.g., allocated to a STA for a transmission), the interleaver and tone mapper shown in FIG. 6 may be used. If multiple RUs are allocated, the BCC interleaver and LDPC tone mapper, as shown in FIG. 6, may need to be modified (e.g., because the total size of multiple RUs allocated to one user may not have been considered). For example, if 3 RUs of size 26 tones are allocated, the total transmission size is 78 tones. The interleaver and tone mapper shown in FIG. 6 may not support a transmission size of 78 tones and modified interleaver and/or tone mapper designs may be provided. The multiple RUs may be contiguously or non-contiguously allocated. Efficient interleaving for contiguous or non-contiguous RU allocation may be provided (e.g., to improve frequency diversity gain).

Signaling and feedback for contiguous/non-contiguous RU allocation may be provided. MCS and CSI feedback from a STA to an AP, or APs, may be solicited or unsolicited. The MCS and CSI feedback may be sent back immediately, or after a delay. CSI feedback may allow for a minimum feedback granularity of less than 20 MHz (e.g., for 802.11ax). Efficient signaling and feedback may reduce signal overhead. Contiguous and/or non-contiguous RU allocation may reduce signal overhead. RU arrangement and/or configuration (e.g., in IEEE 802.11ax) may introduce constraints into the scheduling algorithms.

Interleaver design for multiple RU allocation may be provided. The multiple RU allocation may be contiguous and/or non-contiguous. One or more independent interleavers may be used for the multiple RU allocation. Each of the one or more independent interleavers may be used for each of the multiple RUs allocated. One or more joint interleavers may be provided for contiguous or non-contiguous multiple RU allocation (e.g., to achieve better frequency diversity gain).

A joint interleaver for multiple RU allocation may be provided. When a total number of tones of the multiple allocated RUs is equal to one of the RU sizes from the OFDMA RU sizes as shown in FIG. 6, the example interleaver and tone mapper for OFDMA may be used for the multiple RU allocation. For example, if a STA is allocated two 26-tone RUs, the interleaver design for BCC or tone mapper for LDPC for RU (tones)=52 may be used for the allocation of the two 26-tone RUs. A frequency parser may map the jointly interleaved data stream to the tones in the multiple RUs. Aggregation of contiguous or non-contiguous RUs may be restricted to RU sizes that add up to an existing RU size.

When the total number of tones of the multiple allocated RUs does not equal one of the OFDMA RU sizes as shown in FIG. 6 (e.g., if a STA is allocated 3 26 tone RUs=78 RU tones, there is no interleaver design for RU size=78 tones), a joint interleaver for BCC and/or a tone mapper for LDPC may be provided.

Figure 7:
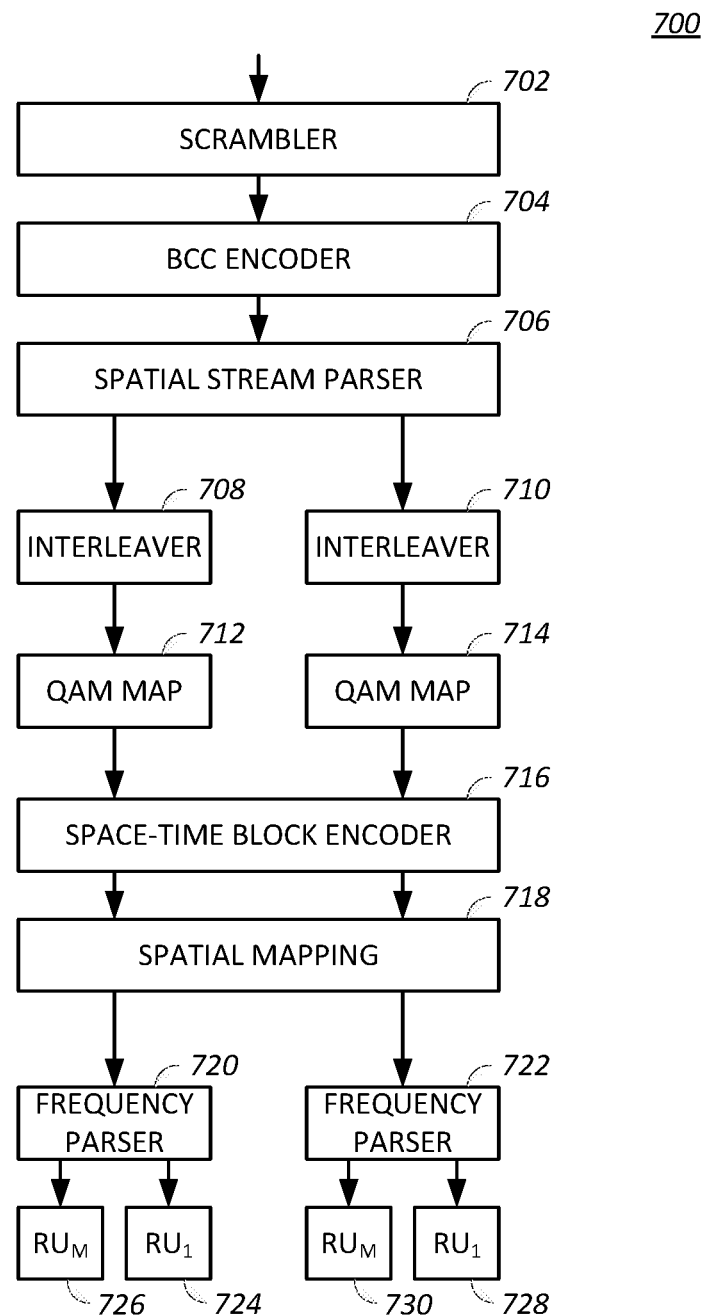
FIG. 7 is a diagram depicting an example transmitter with a joint interleaver for a multiple RU allocation.

FIG. 7 is an example transmitter 700 with a joint interleaver for multiple RU allocation. The example transmitter 700 may be a network device such as an AP, for example. A joint interleaver design for BCC may be provided for multiple RU allocation of a transmission (e.g., a transmission of data to a STA). A transmission of data for a user may include interleaving. The transmission of data for a user (e.g., STA) may include a multiple RU allocation. For example, the data may be sent to the STA using multiple RUs. A network device (e.g., such as an AP) may scramble 702 the data. The scrambled data may be encoded (e.g., by a BCC encoder 704, as shown). An output of the BCC encoder 704 may include an encoded bit stream. The output of the BCC encoder may be sent to a spatial stream parser 706. The spatial stream parser 706 may parse the encoded bit stream into a plurality of spatial streams. An output of the spatial stream parser may be sent to a joint interleaver 708, 710. The joint interleaver 708, 710 may interleave the input encoded bits of the plurality of spatial streams, received from the spatial stream parser 706 according to the example joint interleaver shown in FIG. 6. An output of the joint interleaver 708, 710 may be sent to a QAM mapper 712, 714. The QAM mapper 712, 714 may form one or more symbols. An output of the QAM mapper 712, 714 may be sent to a space-time block encoder 716. An output of the space-time block encoder 716 may be sent to a spatial mapper 718 (e.g., for antenna mapping). An output of the spatial mapper 718 (e.g., the symbols) may be sent to multiple RUs 724, 726, 728, 730 through one or more frequency parsers 720, 722. A receiver (e.g., a STA) may perform interleaving and/or the multiple RU allocation in reverse order than the network device (e.g., to decode the transmitted data).

One or more (e.g., two or three) permutations may be performed in the joint interleaver 708, 710. A first permutation (e.g., first interleaver permutation) may ensure that adjacent encoded bits are mapped onto non-adjacent subcarriers. A second permutation (e.g., second interleaver permutation) may ensure that adjacent encoded bits are mapped alternately onto more and less significant bits. The second permutation may be configured to avoid long runs of low reliability bits. If more than one spatial stream is adopted for a transmission, a third permutation (e.g., a frequency rotation) may be performed for the additional spatial streams.

A spatial stream may include M contiguous and/or non-contiguous RUs. A RU may comprise $N_{sd}^m$ ($1 \leq m \leq M$) data tones. The M contiguous and/or non-contiguous RUs may be scheduled for one user transmission. The number of data tones may be defined as $N = \sum_{m=1}^{M} N_{sd}^m$. For each OFDMA symbol, $x^{i_{ss}} = [x_0^{i_{ss}}, x_1^{i_{ss}}, \ldots, x_{L-1}^{i_{ss}}]$ may denote the input coded bits sent to the joint interleaver 708, 710 for the interleaving operation in the spatial stream $i_{ss}$ ($1 \leq i_{ss} \leq N_{ss}$), where $L = N \times N_{BPSCS}$. $N_{BPSCS}$ may define the number of coded bits per single carrier for each spatial stream. An output bit of the first interleaver permutation, $w_i^{i_{ss}}$, may be defined as $$w_i^{i_{ss}} = x_k^{i_{ss}}$$

$$i = c \cdot N_{BPSCS} \cdot (k \bmod N_{col}) + \left\lfloor \frac{k}{N_{col}} \right\rfloor$$

where $k=0, 1, \ldots, L-1$, $c$, $N_{col}$ are two positive integers such that $c \times N_{col} = N$. The output bit of the second interleaver permutation, $y_j^{i_{ss}}$, may be a function of the output of the first interleaver permutation, $w_i^{i_{ss}}$. The output bit of the second interleaver permutation, $y_j^{i_{ss}}$, may be defined as $$y_j^{i_{ss}} = w_i^{i_{ss}}$$

$$j = s \left\lfloor \frac{i}{s} \right\rfloor + \left(i + L - \left\lfloor \frac{N_{col} \cdot i}{L} \right\rfloor\right) \bmod s$$

where $i=0, 1, \ldots, L-1$, and $$s = \max\left\{1, \frac{N_{BPSCS}}{2}\right\}.$$

A third permutation may be performed (e.g., if more than one spatial stream is present).

If $2 \leq N_{ss} \leq 4$, a frequency rotation may be applied to the output of the second permutation $y_j^{i_{ss}}$ as follows $$z_r^{i_{ss}} = y_j^{i_{ss}}$$

$$r = \left\{ j - \left[ (2(i_{ss}-1)) \bmod 3 + 3 \left\lfloor \frac{i_{ss}-1}{3} \right\rfloor \right] \cdot N_{rot} \cdot N_{BPSCS} \right\} \bmod L$$

where $j=0, 1, \ldots, L-1$, and $N_{rot}$ may be a positive integer.

If $N_{ss} > 4$, a frequency rotation may be applied to the output of the second permutation $y_j^{i_{ss}}$ as follows $$z_r^{i_{ss}} = y_j^{i_{ss}}$$

$$r = \{j - J(i_{ss}) \cdot N_{rot} \cdot N_{BPSCS}\} \bmod L$$

Where $j=0, 1, \ldots, L-1$, $N_{rot}$ may be a positive integer, and $J(i_{ss})$ may be a function of $i_{ss}$ which may be an integer value.

At the receiver, a joint de-interleaver may be used to perform one or more inverse permutation operations. A first inverse operation may reverse the third frequency rotation permutation of the joint interleaver. $z'^{i_{ss}} = [z_0'^{i_{ss}}, z_1'^{i_{ss}}, \ldots z_{L-1}'^{i_{ss}}]$ may represent the input bits of the joint de-interleaver in the spatial stream $i_{ss}$ ($1 \leq i_{ss} \leq N_{ss}$).

When $N_{ss} = 1$, $y_j'^{i_{ss}} = z_r'^{i_{ss}}$, $j = r$, where $r=0, 1, \ldots, L-1$. If $2 \leq N_{ss} \leq 4$, a reversal operation may be performed as follows, $$y_j'^{i_{ss}} = z_r'^{i_{ss}}$$

$$j = \left\{ r + \left[ (2(i_{ss}-1)) \bmod 3 + 3 \left\lfloor \frac{i_{ss}-1}{3} \right\rfloor \right] \cdot N_{rot} \cdot N_{BPSCS} \right\} \bmod L$$

where $r=0, 1, \ldots, L-1$ and $N_{rot}$ may be a positive integer which may take the same value as the interleaving operation at the transmitter.

When $N_{ss}>4$, a reversal operation may be performed as follows $$y'^{iss}_j = z'^{iss}_r$$

$$j = \{r + J(i_{ss}) \cdot N_{rot} \cdot N_{BPSCS}\} \bmod L$$

where $r=0, 1, \ldots, L-1$. $N_{rot}$ may be a positive integer and $J(i_{ss})$ may be a function of $i_{ss}$. $N_{rot}$ and/or $J(i_{ss})$ may take the same values as the interleaving operation at the transmitter.

A second inverse operation may reverse the second permutation of the joint interleaver as follows, $$w'^{iss}_i = y'^{iss}_j$$

$$i = s\left\lfloor \frac{j}{s} \right\rfloor + \left(j + \left\lfloor \frac{j \cdot N_{col}}{L} \right\rfloor\right) \bmod s$$

where $j = 0, 1, \ldots, L-1$.

A third inverse operation may reverse the first permutation of the joint interleaver as follows, $$x'^{iss}_k = w'^{iss}_i$$

$$k = i \cdot N_{col} - (L-1) \left\lfloor \frac{i}{c \cdot N_{BPSCS}} \right\rfloor$$

Figure 8:
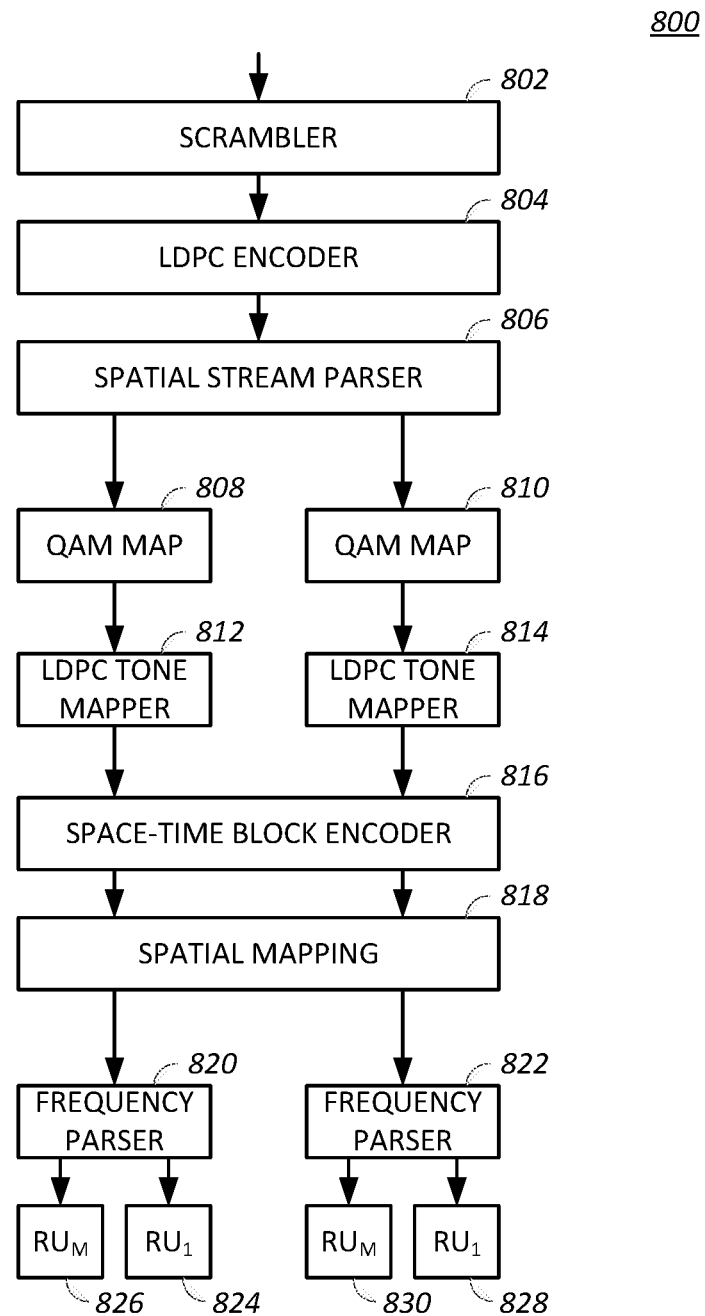
FIG. 8 is a diagram depicting an example transmitter with a joint LDPC tone mapper for a multiple RU allocation.

FIG. 8 is a diagram depicting an example transmitter 800 with a joint LDPC tone mapper for multiple RU allocation. The example transmitter 800 may be a network device such as an AP, for example. A reverse tone mapping operation may be performed by a joint LDPC tone de-mapper at a receiver (e.g., a receiving STA). Data may be sent to the receiver using multiple RUs. A network device (e.g., such as an AP) may scramble 802 the data. The scrambled data may be encoded (e.g., by a LDPC encoder 804, as shown). An output of the LDPC encoder 804 may include an encoded bit stream. The output of the LDPC encoder may be sent to a spatial stream parser 806. The spatial stream parser 806 may parse the encoded bit stream into a plurality of spatial streams. The plurality of spatial streams may be sent to a QAM mapper 808, 810. The QAM mapper 808, 810 may form one or more symbols. An output of the QAM mapper 808, 810 may be sent to a joint LDPC tone mapper 812, 814. An output of the LDPC tone mapper 812, 814 may sent to a space-time block encoder 816. An output of the space-time block encoder 816 may be sent to a spatial mapper 818 (e.g., for antenna mapping). An output of the spatial mapper 818 (e.g., the symbols) may be sent to multiple RUs 824, 826, 828, 830 through one or more frequency parsers 820, 822.

A spatial stream may comprise M contiguous and/or non-contiguous RUs. A RU may comprise $N_{sd}^m$ ($1 \le m \le M$) data tones. The M contiguous and/or non-contiguous RUs may be scheduled for a user transmission (e.g., for the LDPC encoders). A number of data tones may be defined as $N = \Sigma_{m=1}^{M} N_{sd}^m$. The output of a QAM mapper may be defined as $d_{k,l,n}$, $k=0, 1, \ldots, N-1$, $l=1, \ldots, N_{ss}$, $n=0, 1, \ldots, N_{sym}-1$. The number of data tones in the RU, $N_{sd}^m$, may be the same or different for each RU allocated to a STA. N may represent a total number of data tones of the RUs allocated to the STA.

The joint LDPC tone mapper 812, 814 may permute the output of QAM mappers as $$v_{t(k),l,n} = d_{k,l,n}, k = 0, 1, \ldots, N-1, l = 1, \ldots, N_{ss}, n = 0, 1, \ldots, N_{sym-1}$$

$$\text{where } t(k) = D_{TM} \cdot \left(k \bmod \frac{N}{D_{TM}}\right) + \left\lfloor \frac{k \cdot D_{TM}}{N} \right\rfloor,$$

and $D_{TM}$ may be a divisor of N. $D_{TM}$ may be optimized (e.g., via simulation). Two (e.g., every two) consecutively-generated complex constellation numbers may be transmitted on two data subcarriers (e.g., through the LDPC tone mapping operation and subcarrier allocation). The two data subcarriers may be separated by at least $D_{TM}-1$ data subcarriers.

At a receiver, a joint LDPC tone de-mapper may perform one or more inverse (e.g., reverse) permutations. At each stream, the input symbols of the joint LDPC tone de-mapper may be defined as $v'_{k,l,n}$, $k=0, 1, \ldots, N-1$, $l=1, \ldots, N_{ss}$, $n=0, 1, \ldots, N_{sym}-1$. The joint LDPC tone de-mapper may perform the inverse permutation as follows, $$d'_{k,l,n} = v'_{t(k),l,n}, k = 0, 1, \ldots, N-1, l = 1, \ldots, N_{ss}, n = 0, 1, \ldots, N_{sym}-1$$

$$\text{where } t(k) = D_{TM} \cdot \left(k \bmod \frac{N}{D_{TM}}\right) + \left\lfloor \frac{k \cdot D_{TM}}{N} \right\rfloor.$$

An interleaver design, for example as shown in FIG. 6, may be reused when multiple contiguous and/or non-contiguous RUs are scheduled for a user transmission (e.g., to improve frequency diversity). Reusing the interleaver design may reduce the implementation complexity (e.g., in a WLAN transceiver that is based on an earlier IEEE 802.11 specification). A multiplexed, parallel block interleaver may be provided. The multiplexed, parallel block interleaver may be comprised of one or more of the following components: a serial-to-parallel multiplexer, one or more interleavers following the reused design, and/or a parallel-to-serial de-multiplexer.

Figure 9:
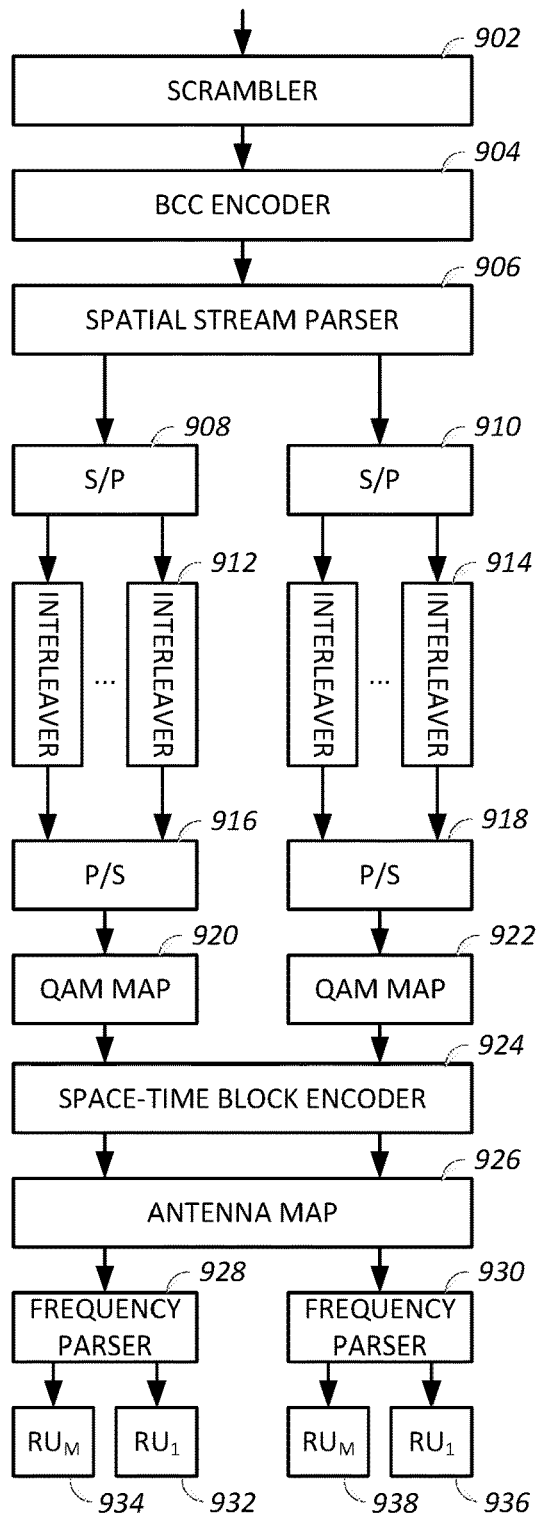
FIG. 9 is a diagram depicting an example transmitter with a multiplexed parallel block interleaver for a multiple RU allocation.

FIG. 9 is a diagram depicting an example transmitter 900 with a multiplexed parallel block interleaver 912, 914. The example transmitter 900 may be a network device such as an AP, for example. At the example transmitter 900, data for a transmission may be sent to a scrambler 902. Scrambled data may be sent to a BCC encoder 904. An output of the BCC encoder 904 may comprise an encoded bit stream. The output of the BCC 904 encoder may be sent to a spatial stream parser 906. The spatial stream parser 906 may parse the encoded bit stream into a plurality of spatial streams. An output of the spatial stream parser 906 may be sent to one or more serial-to-parallel multiplexers 908, 910. The one or more serial-to-parallel multiplexers 908, 910 may allocate the encoded input bits to multiple parallel interleavers 912, 914. The one or more serial-to-parallel multiplexers 908, 910 may allocate the input bits of the encoded bit stream to the multiple parallel interleavers 912, 914, e.g., based on a pre-defined pattern. For example, the input bits of the encoded bit stream may be allocated to the multiple parallel interleavers 912, 914 based on a RU configuration. The number of parallel interleavers 912, 914 may equal the number of RUs allocated for the transmission. Each of the parallel interleavers 912, 914 may correspond to a RU. For example, each of the parallel interleavers may follow the interleaver design, as shown in FIG. 6, for a corresponding RU.

An interleaver may interleave the input encoded bits, e.g., based on the interleaver design, as shown in FIG. 6. An output of the multiple parallel interleavers 912, 914 may be sent to a parallel-to-serial de-multiplexer 916, 918. The parallel-to-serial de-multiplexer 916, 918 may combine the outputs of the multiple parallel interleavers 912, 914 into a bit stream. The parallel-to-serial de-multiplexer 916, 918 may combine the outputs based on a pre-defined pattern. The parallel-to-serial de-multiplexer 916, 918 may send an output to a QAM mapper 920, 922. The QAM mapper 920, 922 may form one or more symbols from the combined outputs. The output of the QAM mapper 920, 922 may be sent to a space-time block encoder 924. The space-time block encoder 924 may operate on a per subcarrier basis. An output of the space-time block encoder 924 may be sent to an antenna mapper 926. The antenna mapper 926 may operate on a per subcarrier basis. After space-time encoding and antenna mapping, the one or more symbols may be sent to multiple RUs 932, 934, 936, 938 through a frequency parser 928, 930. A receiver (e.g., a receiving STA) may perform a RU de-allocation in the reverse of the RU allocation performed at the transmitter.

A multiplexed parallel block interleaver may be configured for multiple equal size RU allocation. One or more parallel interleavers for a user (e.g., STA) may be identical. The one or more parallel interleavers may be based on the interleaver design shown in FIG. 6. M contiguous and/or non-contiguous RUs may comprise $N_{sd}$ data tones. The M contiguous and/or non-contiguous RUs may be scheduled for a transmission (e.g., a particular user transmission). The length of one or more input bits (e.g., for each OFDMA symbol) to a multiplexed parallel block interleaver may be defined as $L=MN_{sd}N_{BPSCS}$. The one or more input bits may be defined as $b=[b_0, b_1, \ldots, b_{L-1}]$. A serial-to-parallel multiplexer may allocate (e.g., uniformly allocate) the encoded bits to multiple interleavers. When the serial-to-parallel multiplexer uniformly allocates the encoded bits, the input of an interleaver m (1≤m≤M) may be defined as follows:

$$x_{m,i} = b_{iM+m-1},$$

where $i = 0, 1, \ldots, \frac{L}{M} - 1.$

L/M may represent the size of the $m^{th}$ parallel interleaver. The input bits may be interleaved based on the interleaver design shown in FIG. 6. The output of a parallel interleaver m (1≤m≤M) may be represented as $$y_m = \left[ y_{m,1}, y_{m,2}, \ldots, y_{m,\frac{L}{M}-1} \right].$$

The outputs of the multiple parallel interleavers may be sent to a parallel-to-serial de-multiplexer. The parallel-to-serial de-multiplexer may determine a bit stream. The parallel-to-serial de-multiplexer may determine the bit stream by combining the output of multiple parallel interleavers. The parallel-to-serial de-multiplexer may use different combining patterns. The output of the parallel-to-serial de-multiplexer may be defined as follows:

$$z_l = y_{m,i},$$

where l=(m−1)L/M+i, i=0, 1, . . . , $$\frac{L}{M} - 1,$$

and m=1, 2, . . . , M. l may represent an index of the output of the parallel-to-serial de-multiplexer. For example, the outputs of the multiple parallel interleavers may be combined into one sequence $z=[y_1, y_2, \ldots, y_M]$. $y_m$ may represent a row vector of length (L/M). $y_m$ may indicate an output sequence of the $m^{th}$ parallel interleaver. The output of the parallel-to-serial de-multiplexer may be sent to a QAM mapper. The QAM mapper may form symbols based on the parallel-to-serial de-multiplexer output. The output of the QAM mapper may be sent to a space-time block encoder. The output of the space-time block encoder may be sent to an antenna mapper. After space-time encoding and antenna mapping, the symbols may be mapped (e.g., uniformly mapped) to one or more subcarriers of one or more RUs scheduled for a transmission (e.g., a particular user's transmission).

Figure 10:
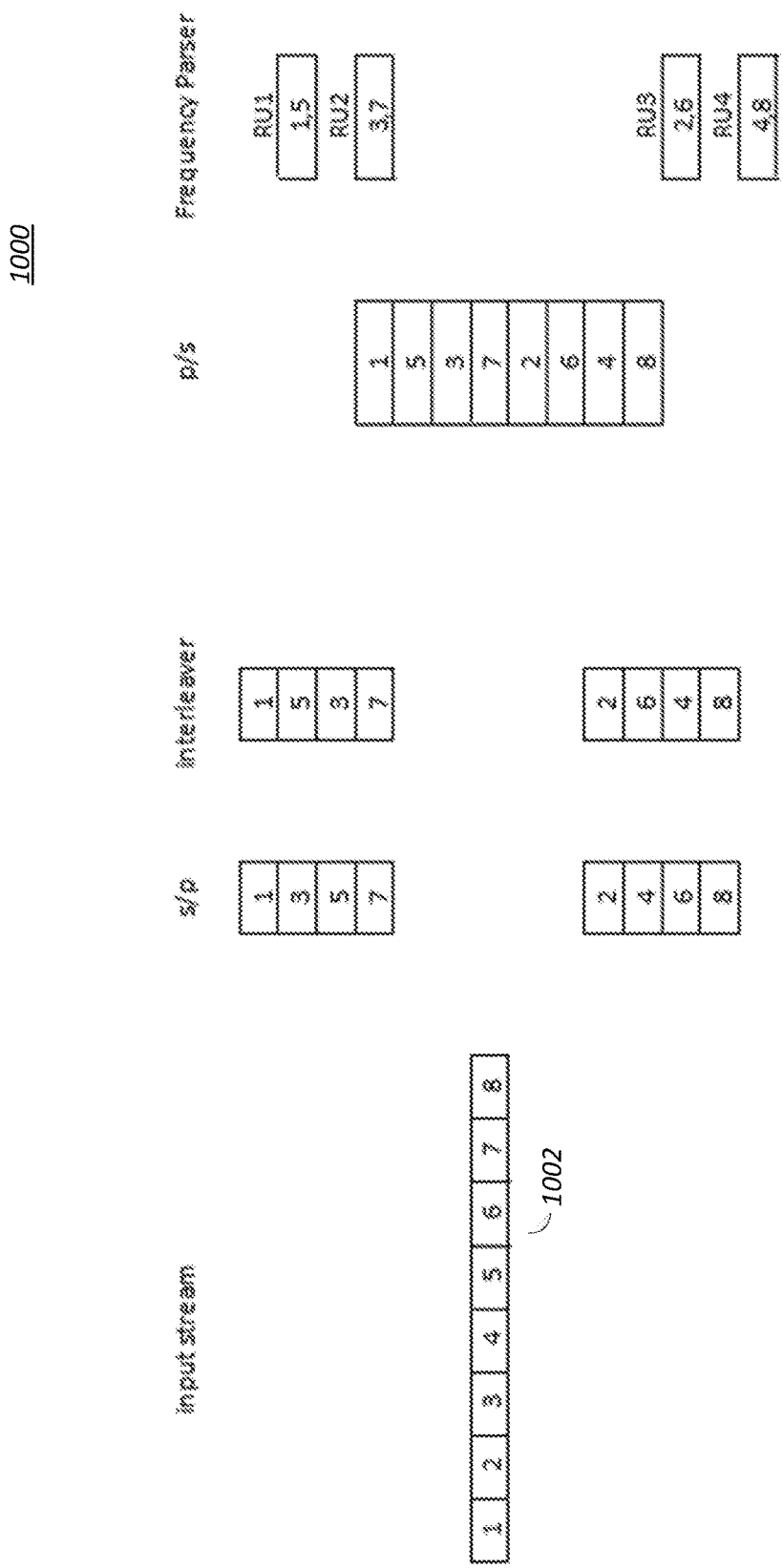
FIG. 10 is a diagram depicting an example transmitter data flow for a multiple equal-size RU allocation.

FIG. 10 is a diagram depicting an example data flow 1000 for multiple equal-size RU allocation. A bit stream of data 1002 may flow through one or more modules (e.g., key modules) of a transmitter, such as the transmitter shown in FIG. 9. The bit stream of data 1002 may comprise one or more (e.g., 8) blocks of data. The one or more blocks of data may be allocated to different interleavers. The values a,b in a frequency parser may define a QAM symbol (e.g., such as QPSK) made up of bits a and b. A receiver data flow may be the reverse of the transmitter data flow shown in FIG. 10. The example data flow shown in FIG. 10 may illustrate the exemplary multiplexing and/or de-multiplexing operations. Other operations shown in the example of FIG. 10 may be simplified.

Example simulation results may be provided herein. A non-OFDMA case may determine a baseline. The baseline may be used to demonstrate the performance of a multiplexed parallel block interleaver. In the non-OFDMA case, a RU with the largest size for the considered bandwidth may be allocated. The RU may use the interleaver design shown in FIG. 6.

Figure 11:
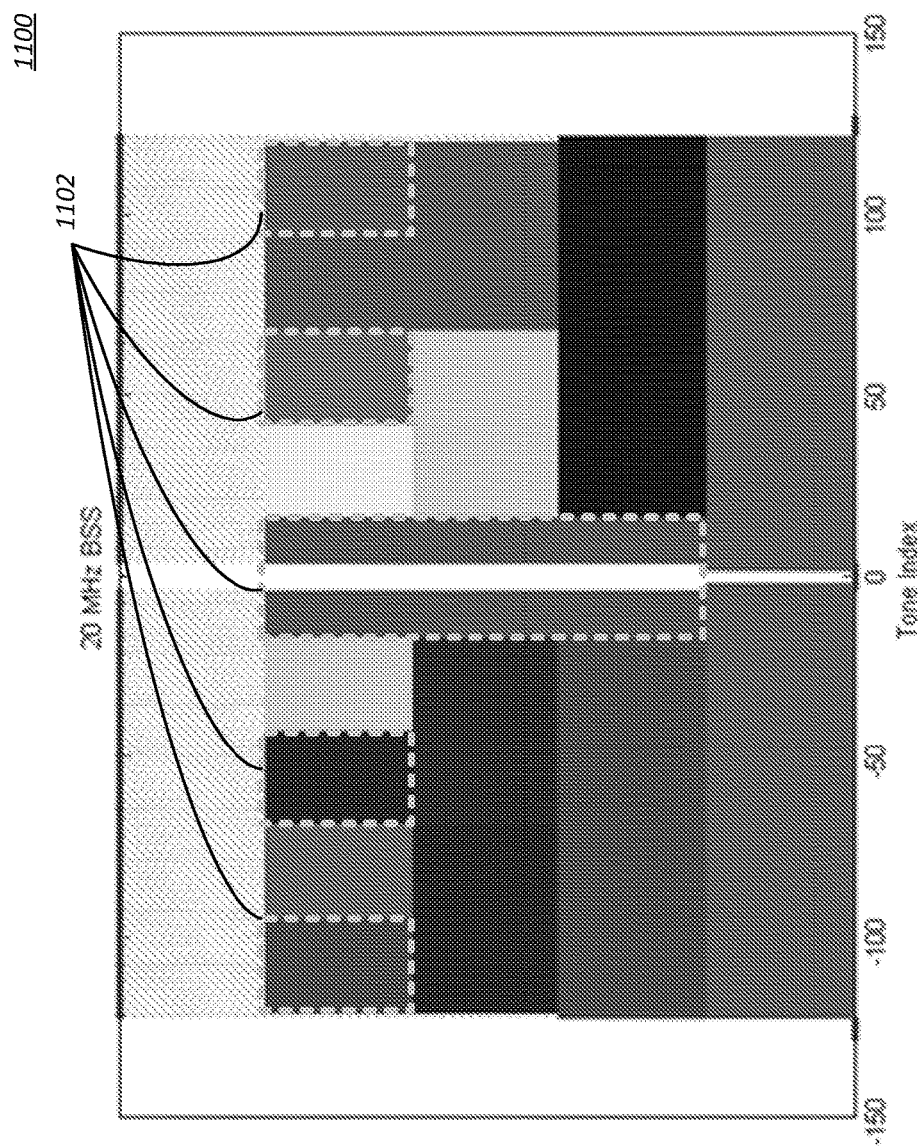
FIG. 11 shows an example of OFDMA numerology for a 20 MHz building block highlighting 5 non-contiguous RUs with 26 tones.
Figure 12:
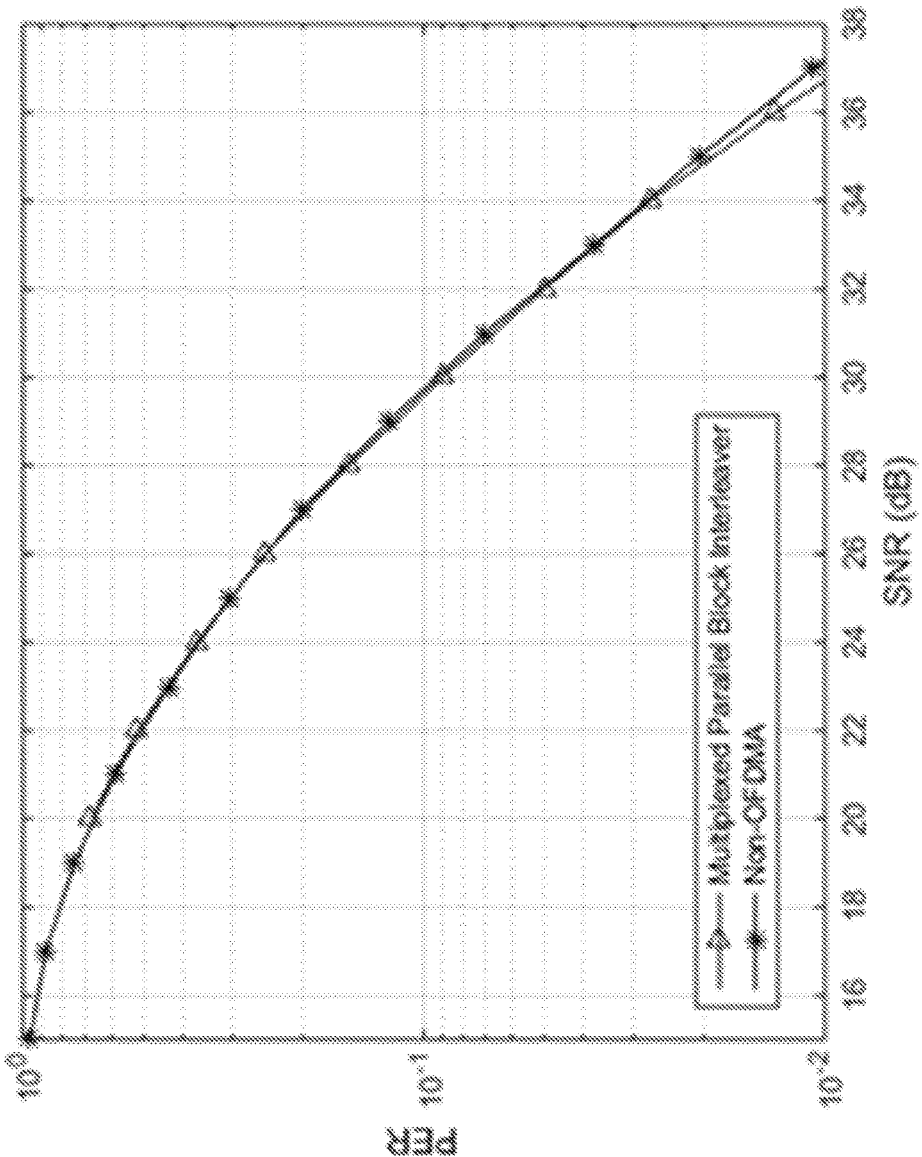
FIG. 12 is a chart depicting an example performance of a multiplexed parallel block interleaver for a TG-B channel.
Figure 13:
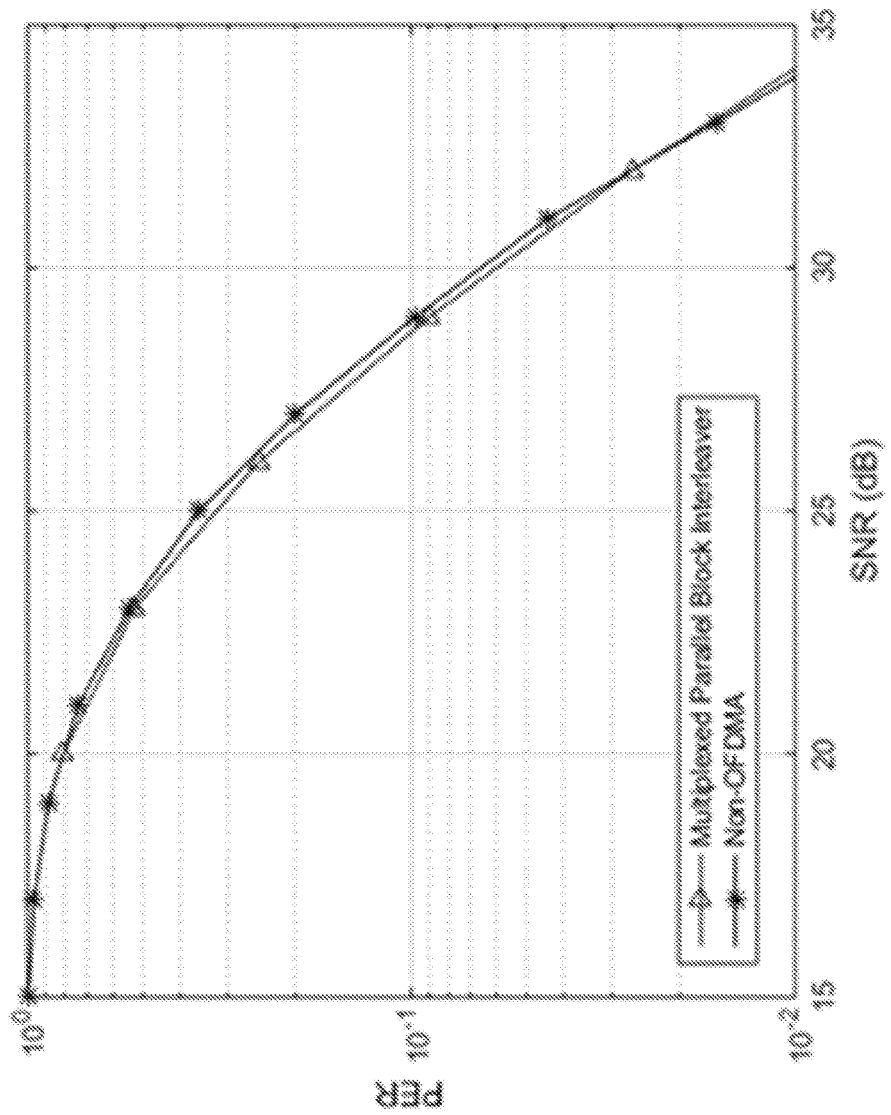
FIG. 13 is a chart depicting an example performance of a multiplexed parallel block interleaver for a TG-D channel.
Figure 14:
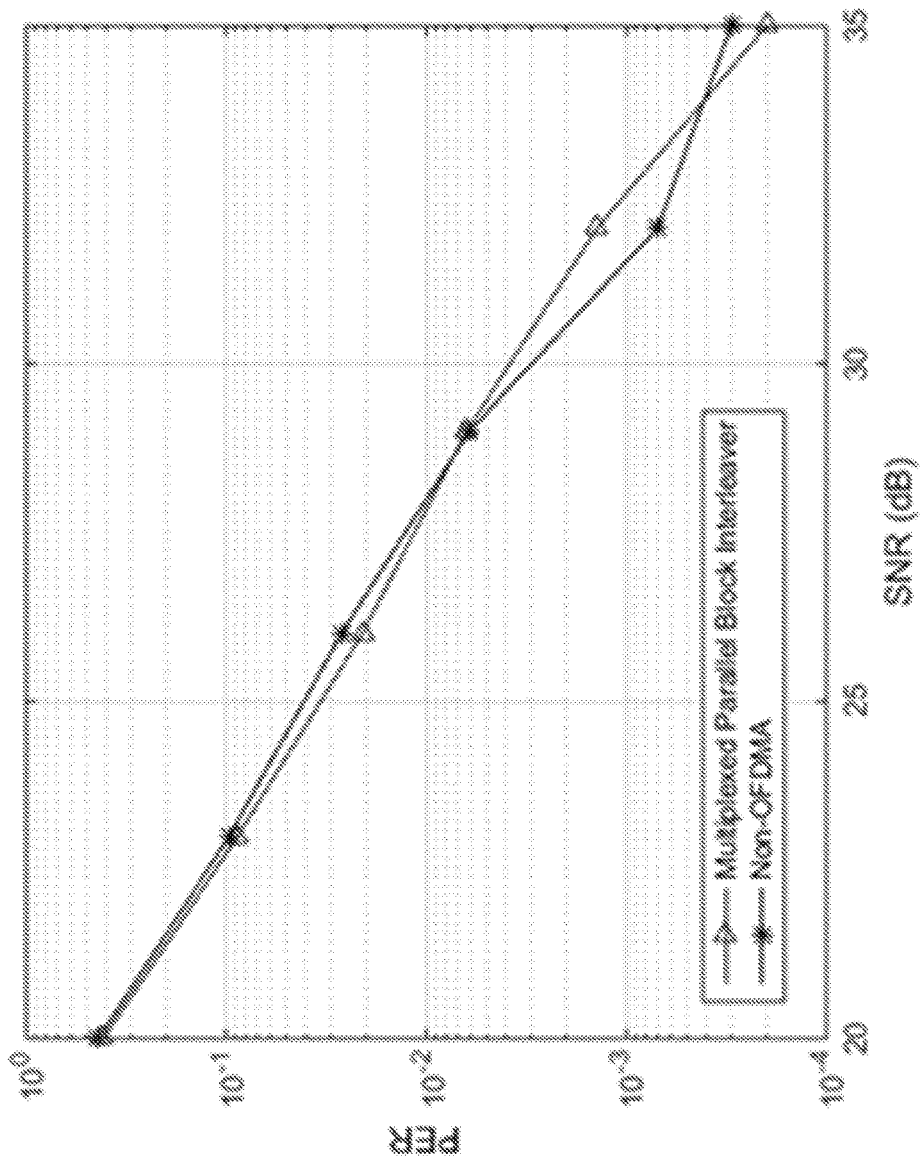
FIG. 14 is a chart depicting an example performance of a multiplexed parallel block interleaver for a UMi-LOS channel.
Figure 15:
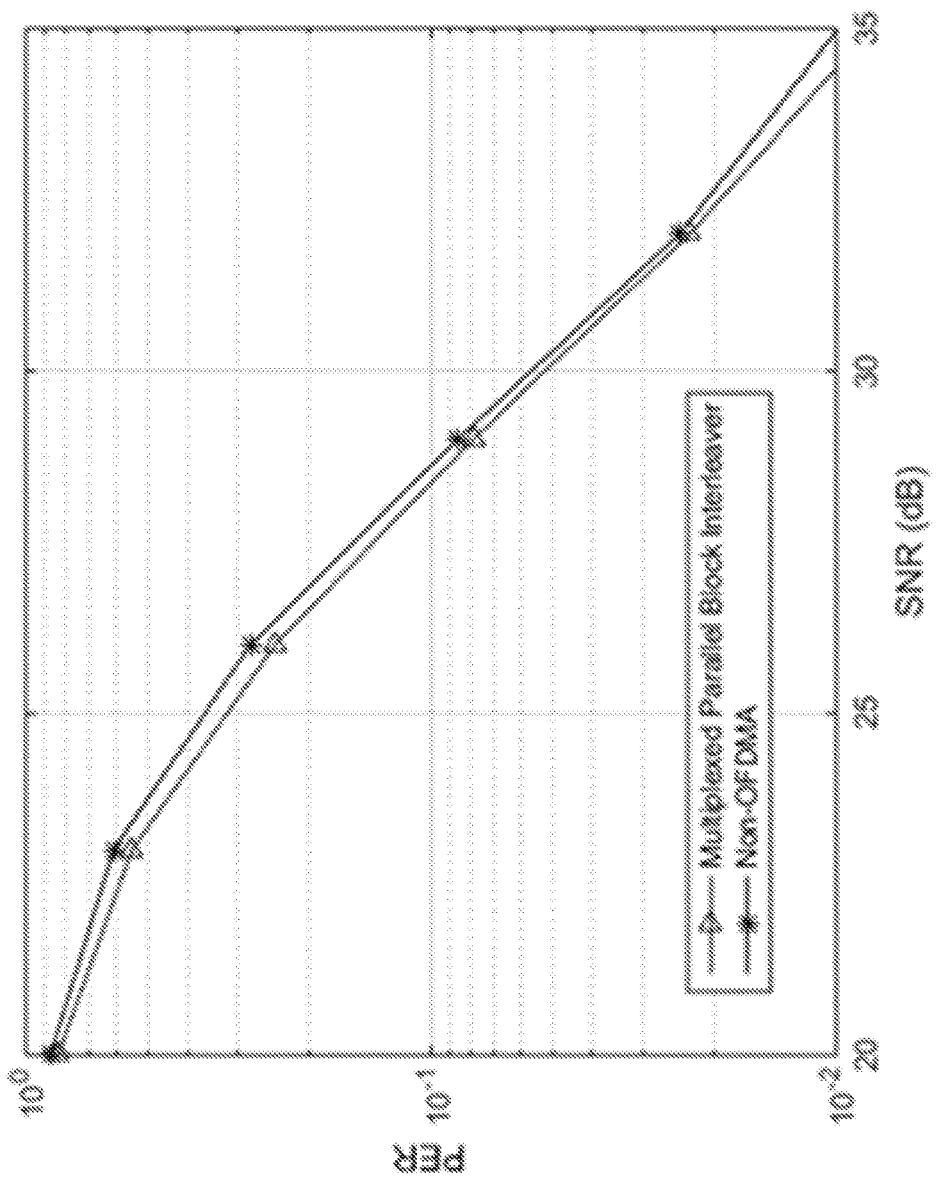
FIG. 15 is a chart depicting an example performance of a multiplexed parallel block interleaver for a UMi-NLOS channel.

FIG. 11 is a diagram depicting an example of OFDMA numerology for a 20 MHz building block, such as for example FIG. 2, with 5 highlighted non-contiguous RUs 1102. The 5 highlighted non-contiguous RUs 1102 may comprise 26 tones. The 5 highlighted non-contiguous RUs 1102 may be scheduled for a transmission (e.g., one user transmission). A spatial stream may be used for the transmission. An MCS (e.g., 7) may be adopted for the transmission. The payload length for the transmission may be 1000 bytes. The PER performance for the multiplexed parallel block interleaver and the non-OFDMA case may be represented as shown in FIG. 12 through FIG. 15 for TG-B, TG-D, Umi-LOS and Umi-NLOS channels, respectively. For indoor TG-B and TG-D channels, the CP length may be set as 800 ns. For outdoor Umi-LOS and Umi-NLOS channels, the CP length may be set as 3200 ns. A multiplexed parallel block interleaver with 5 RU allocation may achieve equivalent PER performance as the non-OFDMA case corresponding to 9 RU allocation. The multiplexed parallel block interleaver may harvest the full-bandwidth frequency diversity gain.

A multiplexed parallel block interleaver for multiple unequal-size RU allocations may be provided. The interleaving operation for an unequal-size RU allocation may be similar to the interleaving operation for an equal-size RU allocation. The interleaving operation for an unequal-size RU allocation may include a serial-to-parallel multiplexer (e.g., due to the unequal RU sizes). The interleaving operation for an unequal-size RU allocation may include a parallel-to-serial de-multiplexer (e.g., due to the unequal RU sizes).

In a spatial stream, M contiguous and/or non-contiguous RUs may comprise $N_{sd}^m$ (1≤m≤M) data tones. The M contiguous and/or non-contiguous RUs may be scheduled for a transmission (e.g., one user transmission). For each OFDMA symbol, the length of one or more input bits to a multiplexed parallel block interleaver may be represented as $L=\Sigma_{m=1}^{M}N_{sd}^m \times N_{BPSCS}$. The one or more input bits may be defined as $b=[b_0, b_1, \ldots, b_{L-1}]$. The number of data tones may be defined as $N=\Sigma_{m=1}^{M}N_{sd}^m$. A serial-to-parallel multiplexer may allocate the encoded bits to multiple parallel interleavers. The serial-to-parallel multiplexer may adopt one or more allocation patterns. A greatest common divisor (GCD) of $N_{sd}^m$ (m=1, 2, ..., M) may be represented as D, and may define $$C_m = \frac{N_{sd}^m}{N}.$$

The input of interleaver m (1≤m≤M) may be defined as follows:

$$x_{m,i} = b_t, \; i = 0, 1, \ldots, q_m - 1$$

where $$t = \left\lfloor \frac{i}{C_m} \right\rfloor \left| \sum_{j=1}^{M} C_j + \sum_{j=1}^{m-1} C_j \right| + i \bmod C_m$$

and $$q_m = \frac{N_{sd}^m}{N} L = N_{sd}^m N_{BPSCS}$$

Note that $q_m$ may represent the size of the $m^{th}$ interleaver.

For an interleaver, the input bits may be interleaved following the interleaver design shown in FIG. 6. The output of the $m^{th}$ (1≤m≤M) interleaver may be defined as $y_m=[y_{m,0}, y_{m,1}, \ldots, y_{m,q_m-1}]$. The outputs of the multiple parallel interleavers may be sent to a parallel-to-serial de-multiplexer. The parallel-to-serial de-multiplexer may combine the outputs of the multiple parallel interleavers to form one bit stream. One or more combining patterns may be adopted by the parallel-to-serial de-multiplexer. The output of the parallel-to-serial de-multiplexer may be defined as follows:

$$z_l = y_{m,i},$$

where $l=(\Sigma_{p=1}^{m-1}q_p+i)$, $i=0, 1, \ldots, q_m-1$, and $m=1, 2, \ldots M$.

l may represent an index of the output of the parallel-to-serial de-multiplexer. For example, the outputs of the multiple parallel interleavers may be combined into one sequence. The combined sequence may be represented by $z=[y_1, y_2, \ldots, y_M]$. $y_m$ may represent a row vector of length $q_m$. The row vector may indicate an output sequence of the $m^{th}$ interleaver. The output of the parallel-to-serial de-multiplexer may be sent to a QAM mapper. The QAM mapper may form one or more symbols based on the parallel-to-serial de-multiplexer output. The output of the QAM mapper may be sent to a space-time block encoder. The output of the space-time block encoder may be sent to an antenna mapper. After space-time encoding and antenna mapping, the one or more symbols may be mapped (e.g., uniformly mapped) to the subcarriers of the RUs scheduled for the transmission (e.g., transmit user).

Figure 16:
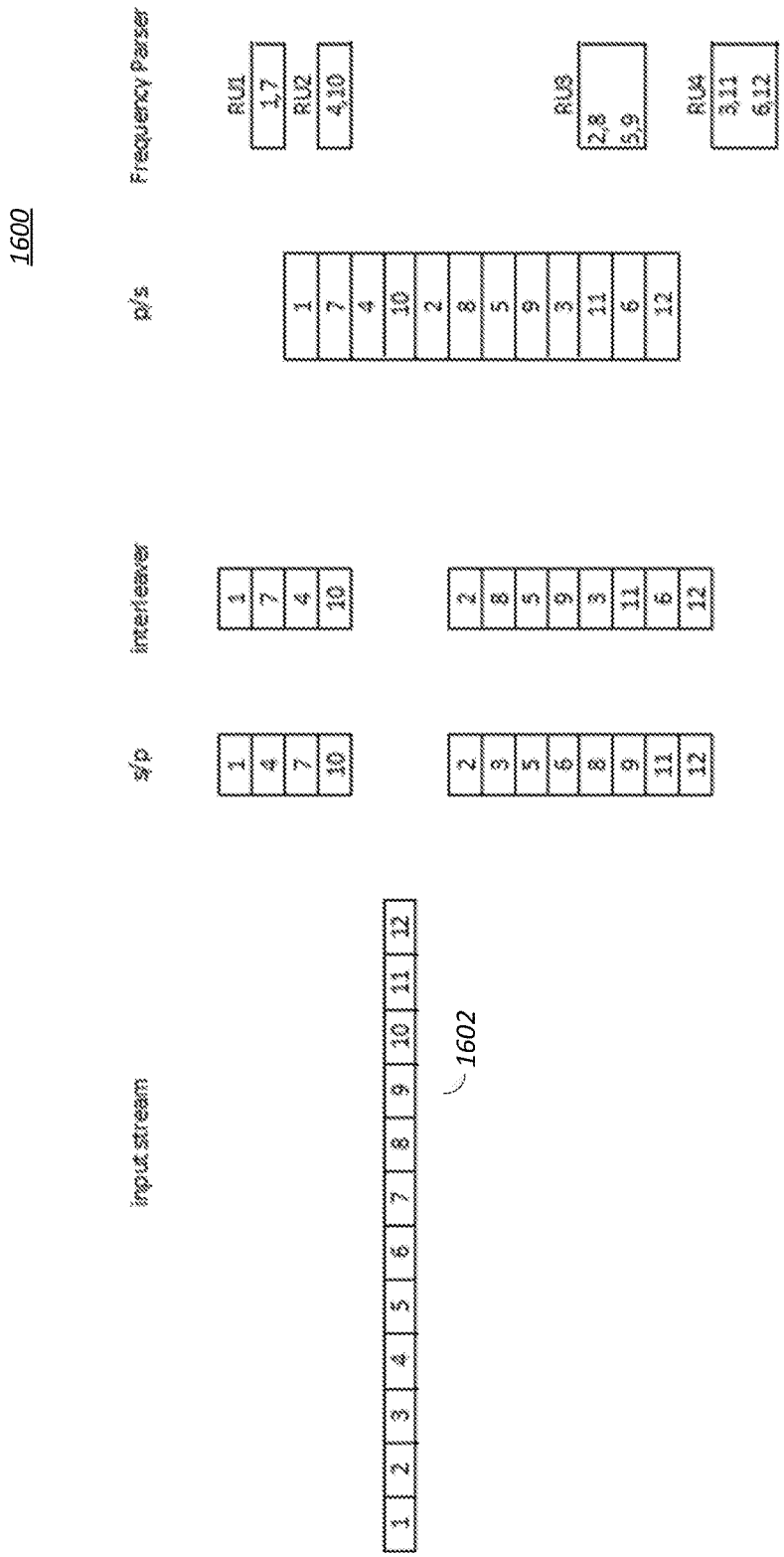
FIG. 16 is a diagram depicting an example transmitter data flow for a multiple unequal-size RU allocation.

FIG. 16 is a diagram depicting an example data flow 1600 for a multiple unequal-size RU allocation for a data transmission. A bit stream of data 1602 may flow through one or more modules (e.g., key modules) of a transmitter (e.g., such as the example transmitter shown in FIG. 9). The bit stream of data 1602 may include one or more (e.g., 12) blocks of data. The values a, b in the frequency parser may define a QAM symbol (e.g., QPSK). The QAM symbol may comprise bits a and b. RU3 and RU4 may be twice the size of RU1 and RU2, respectively. A receiver data flow may be the reverse of the transmitter data flow shown in FIG. 16. The example data flow shown in FIG. 16 may illustrate the multiplexing and/or de-multiplexing operations. Other operations shown in the example data flow of FIG. 16 may be simplified.

A controlled multiplexed parallel block interleaver may be provided for contiguous and/or non-contiguous multiple RU allocation. Control information (e.g., RU-based CSI information) may be available. A transmitter may control a multiplexed parallel block interleaver using the control information. For example, the transmitter may adapt the MCS on a per RU basis, based on the control information. The transmitter may adapt a modulation (e.g., if the same coding rate is assumed) on a per RU basis, based on the control information. The control information may be used in a multiplexed parallel block interleaver, a MIMO scheme, and/or a frequency parser.

A multiplexed parallel block interleaver may support a different MCS on a per RU basis. The MIMO scheme and/or a physical RU allocation may be controlled on a per RU basis.

Figure 17:
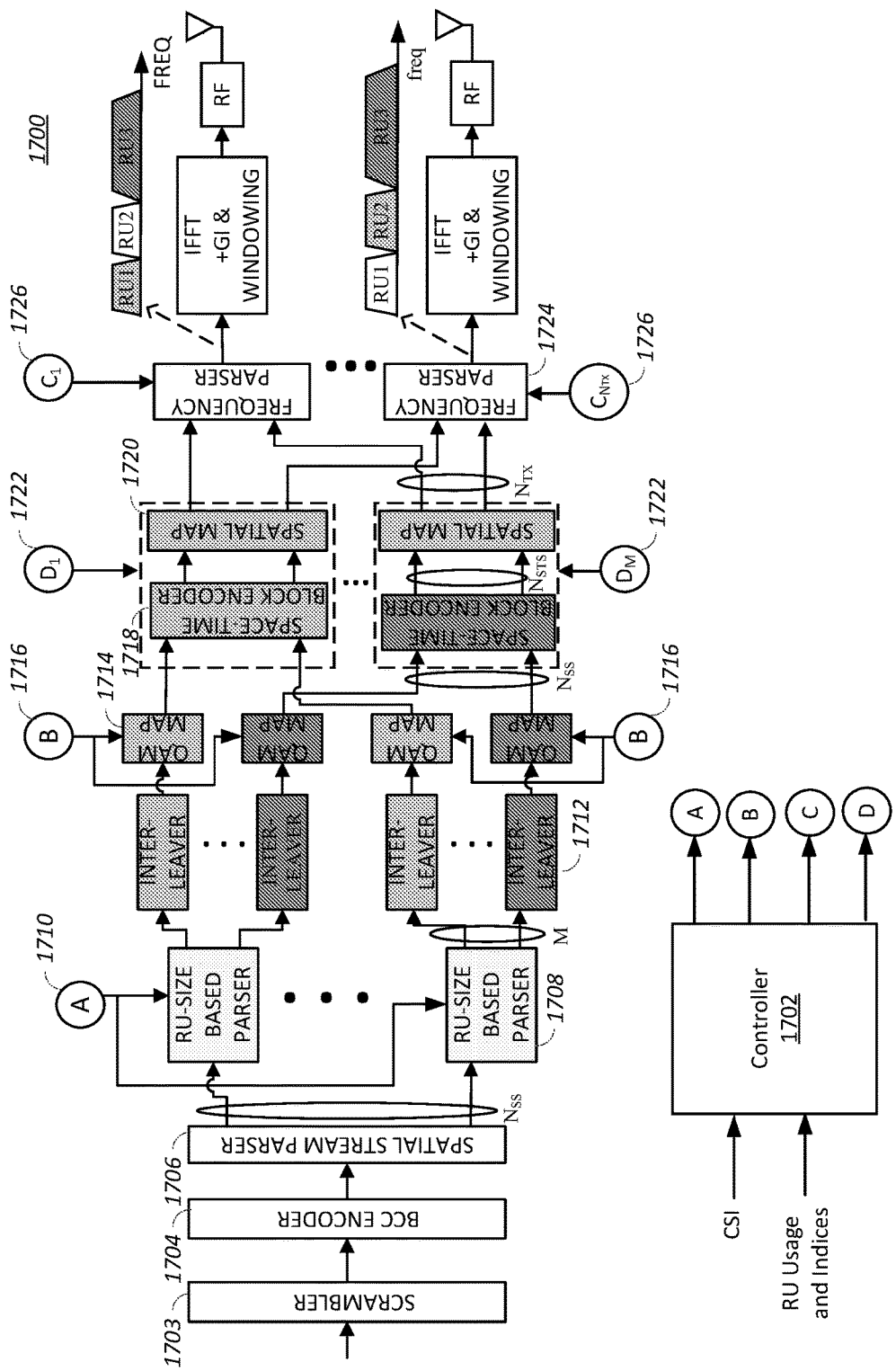
FIG. 17 is a diagram depicting an example transmitter with a controlled multiplexed parallel block interleaver for a multiple RU allocation.

FIG. 17 illustrates example transmitting device features 1700, including a controlled multiplexed parallel block interleaver for multiple RU allocation. The example transmitting device may be a network device such as an AP, for example. The example transmitting device features 1700 may include a control function that enables the multiplexed parallel block interleaver. The control function may be provided by a controller 1702. The controller 1702 may receive channel related feedback information as an input. The channel related feedback information may be received by the example transmitter. The channel related feedback information may indicate a channel condition on one or more RUs given the system bandwidth (e.g., RU-based CSI and/or SINR information). The example transmitter may receive RU usage, RU load, RU sizes, one or more RU indices, QoS, traffic priorities, and/or traffic classes to control the multiplexed parallel block interleaver. For example, the controller 1702 may receive RU usage and/or load as an input. The controller 1702 may receive RU Indices as an input. The controller 1702 may receive QoS for traffic allocated to different RUs as an input. The controller 1702 may receive one or more traffic priorities and/or traffic classes as an input.

The controller 1702 may output one or more control signals (e.g., control signals A 1710, B 1716, C 1726, and D 1722 as shown in FIG. 17), which may include one or more of the outputs described herein. The output of the controller 1702 (e.g., control signal A 1710) may indicate how to split the input bits between different interleavers, e.g., based on the RU configuration. For example, the example transmitter may determine how to allocate the input bits based on the RU configuration. A RU-size based parser 1708 may allocate the input bits based on the determined allocation. The output of the controller 1702 (e.g., control signal B 1716) may include a first M×1 vector. The control signal B 1716 (e.g., the size of control signal B 1716) may correspond to the number of RUs configured per transmit chain. The same number of RUs may be configured for multiple transmit chain (e.g., if MIMO scheme is applied). The first M×1 vector may indicate one or more modulation implementations for different RUs. The example transmitter may map 1714 the input bits to one or more constellation points based on the indicated modulation implementations. For example, with the CSI feedback information, a transmitter may use different MCSs for different RUs. For a RU with a good channel condition, a transmitter may use a high order MCS (e.g., to improve the throughput). For a RU with a bad channel condition, the example transmitter may use a low order MCS (e.g., to improve the PER performance). A flexible tradeoff between throughput performance and PER performance may be obtained by per-RU based MCS adaption enabled by feedback (e.g., channel related feedback information). One or more scheduled RUs may be assumed to use the same coding rate with different modulation types or orders (e.g., to minimize complexity). The output of the controller 1702 (e.g., control signal C 1726) may include a $N_{TX} \times 1$ vector. The $N_{TX} \times 1$ vector may indicate one or more RUs to be used. Different transmitters may use different physical RUs. A frequency parser 1724 may use the $N_{TX} \times 1$ vector to send the data to the indicated RUs. The output of the controller 1702 (e.g., control signal D 1722) may include a second M×1 vector. The second M×1 vector may indicate one or more MIMO schemes to be used for each RU. Control signal D 1722 (e.g., the size of control signal D 1722) may correspond to a maximum number of RUs crossing multiple transmit chains (e.g., where the same or different MIMO schemes apply).

The example transmitter shown in FIG. 17 may perform one or more of the following: an interleaving operation 1712, a MIMO scheme selection, or a subcarrier allocation for the example transmitter and associated receiver with controlled multiplexed parallel block interleavers. Data for transmission to a receiver (e.g., a STA) may be scrambled 1703 and sent to a BCC encoder 1704. The BCC encoder 1704 may generate an encoded bit stream. The output of the BCC encoder 1704 (e.g., the encoded bit stream) may be sent to a spatial stream parser 1706. The spatial stream parser 1706 may parse the encoded bits of the encoded bit stream to a plurality of spatial streams. The encoded bits of the encoded bit stream may be parsed into a plurality of spatial streams based on RU size. An output of the spatial stream parser (e.g., the plurality of spatial streams) may be sent to a RU-size based parser 1708 after spatial stream parsing. The RU-size based parser 1708 may be controlled by a control signal (e.g., control signal A 1710). For example, the transmitter may determine how to allocate the input bits between a plurality of interleavers. Control signal A 1710 may be used to indicate to the RU-size based parser 1708 how to split the input bits between different interleavers based on the RU configuration (e.g., the size of configurable RU), the MCS, and/or the modulation order (e.g., if assuming the same coding rate). The RU-size based parser 1708 may allocate the input bits to a plurality of interleavers based on the indication of how to split the input bits.

An interleaver 1712 may interleave the input encoded bits based on the interleaver design shown in FIG. 6. The outputs of the interleaver 1712 may be sent to a QAM mapper 1714. The QAM mapper 1714 may form one or more symbols. In the controlled multiplexed parallel block interleavers, different interleavers (e.g., for different RUs) may use different modulation orders. Multiple QAM mappers 1714 may be included in the multiplexed parallel block interleaver. Each of the multiple QAM mappers 1714 may serve a corresponding interleaver. The RUs adopting the same MCS may be equivalent to placing a QAM mapper (e.g., a single QAM mapper) after the multiplexed parallel block interleaver, as discussed herein.

When space-time encoding and/or spatial mapping is enabled, a STBC encoder 1718 may spread one or more constellation points from one or more spatial streams into one or more space-time streams. The STBC encoder 1718 may spread the one or more constellation points using a space-time block code. A spatial mapper 1720 may map the one or more space-time streams to one or more transmit chains. The space-time encoding and/or antenna mapping operation may be performed on a per-RU basis. The space-time encoding and/or antenna mapping may be controlled by a control signal (e.g., signal D 1722). Control signal D 1722 may be represented as a M×1 vector. Control signal D 1722 may indicate one or more MIMO schemes for each RU. The one or more MIMO schemes may include precoding and/or beamforming. Different RUs may use the same or different MIMO schemes. The example transmitter may select a MIMO scheme for each RU associated with the transmission based on the one or more MIMO schemes indicated. The space-time block encoding may be performed based on the selected MIMO schemes. When the same MIMO scheme is selected for different RUs, the NC spatial streams may correspond to the same or different (e.g., Nss=2 STBC) RU location. Nss spatial streams with the same size may be coded by the same space-time encoder and/or spatial mapper.

After space-time encoding and/or antenna mapping, the symbols may be sent to multiple RUs through a frequency parser 1724 based on a control signal (e.g., control signal C 1726). Control signal C 1726 may indicate which RUs should be used for each transmitting antenna. For example, the transmitter may determine which RUs should be used on a per transmit chain (e.g., transmitter antenna) basis based on CSI feedback information. Different transmit chains may use the same or different physical RUs. For a transmit chain, multiple contiguous and/or non-contiguous physical RUs may be allocated to one or more users.

Figure 18:
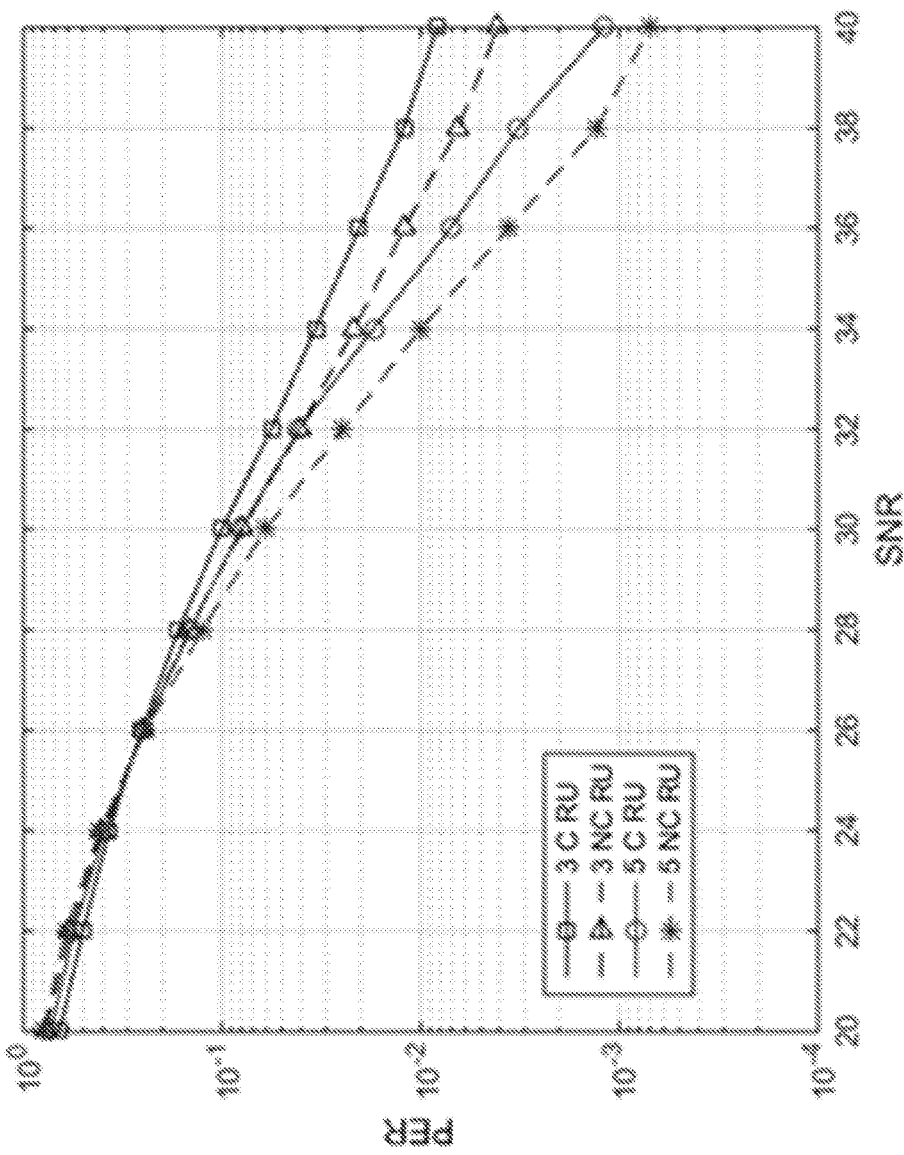
FIG. 18 is a chart depicting an example performance between contiguous and non-contiguous RU allocations.

FIG. 18 is a chart depicting an example performance between contiguous and non-contiguous RU allocations. Non-contiguous RU allocations (e.g., labeled as "NC") may be enabled by control signal C. The non-contiguous RU allocations may provide better performance over contiguous RU allocations (e.g., labeled as "C").

Figure 19:
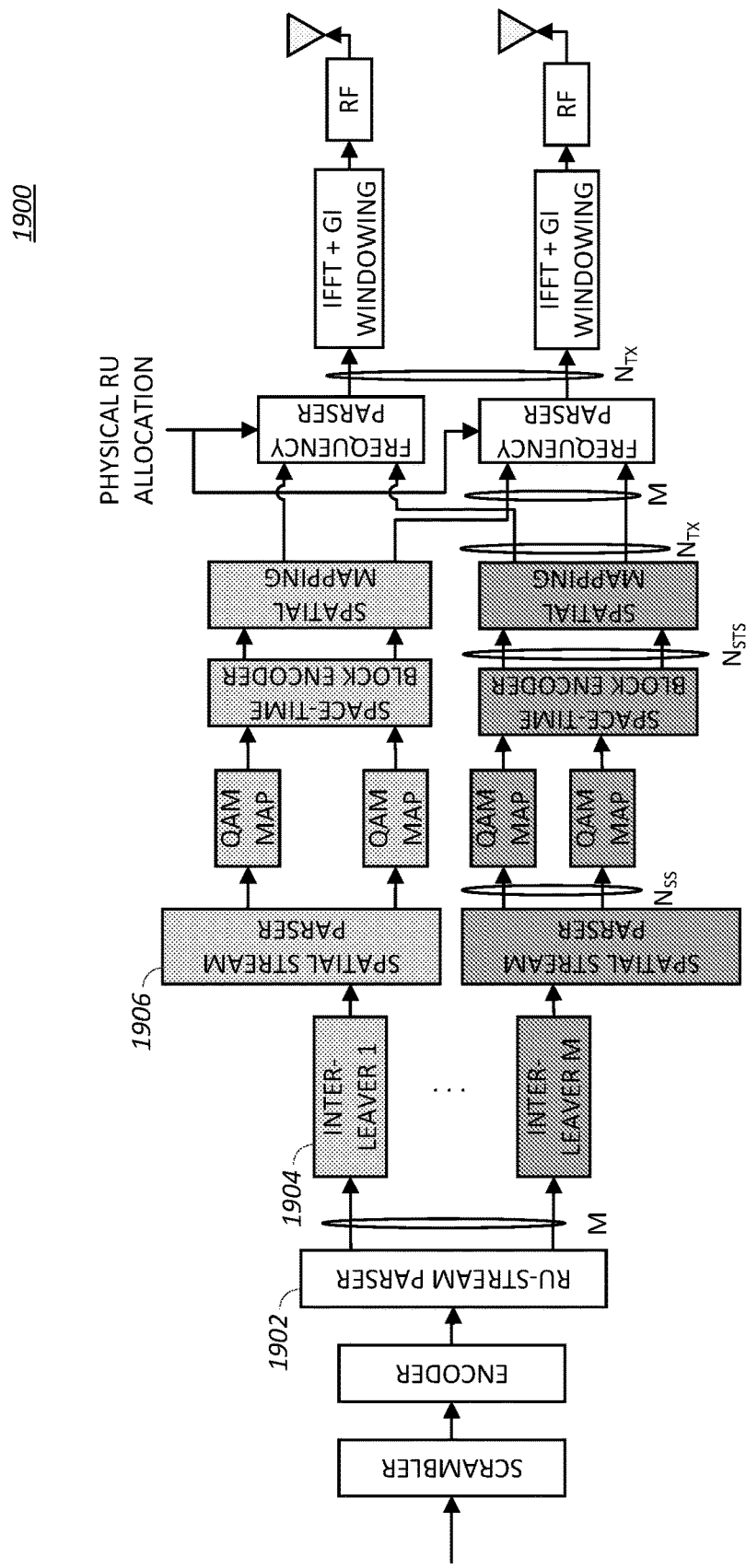
FIG. 19 is a diagram depicting an example transmitter with a multiplexed parallel block interleaver for a multiple RU allocation prior to spatial multiplexing.

FIG. 19 is a diagram depicting an example transmitter 1900 with multiplexed parallel block interleaver for multiple RU prior to spatial multiplexing. The example transmitter 1900 may be a network device such as an AP, for example. A transmitter structure (e.g., such as the transmitter of FIG. 17) may be modified by swapping the order of spatial stream parsing and RU stream parsing. For example, the encoded bit stream may be allocated 1902 to a plurality of interleavers 1904 and may be interleaved before being parsed 1906 into a plurality of spatial streams. The modified transmitter 1900 may need one set of M interleavers.

Figure 20:
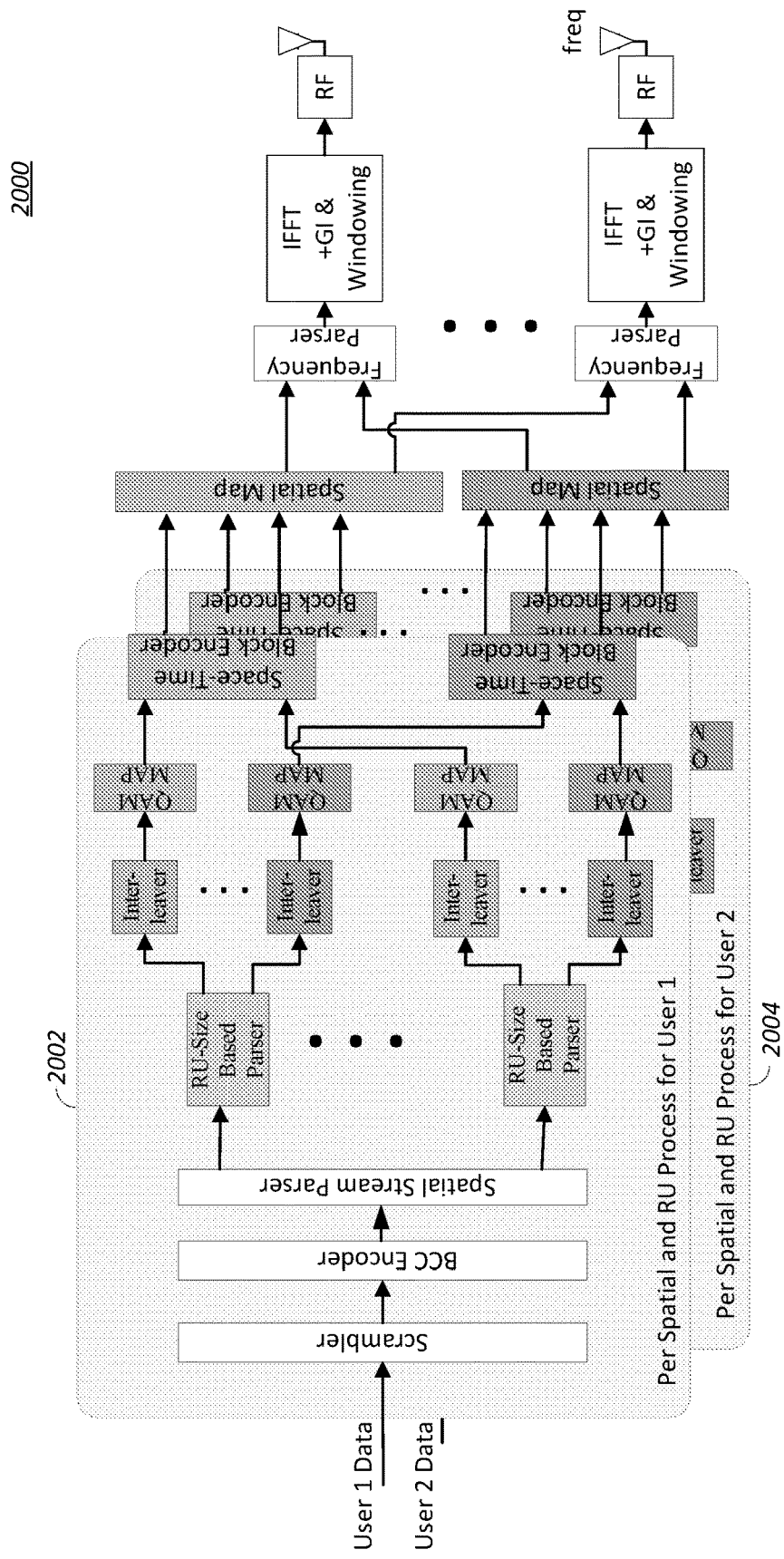
FIG. 20 is a diagram depicting an example transmitter with a multiplexed parallel block interleaver for a multiple RU and multi-user allocation.

FIG. 20 is a diagram depicting an example transmitter 2000 with multiplexed parallel block interleaver for multiple RU and multi-user allocation. The transmitters disclosed herein may be extended to multiple user cases (e.g., a two user scenario). In a multiple user case, one or more control parameters (e.g., as shown in FIG. 17) may be set on a per user basis. A first data transmission 2002 associated with a first user may allocate the encoded bits of the first data transmission 2002 to a plurality of interleavers (e.g., using one or more first RU-size based parsers after spatial stream parsing), QAM map, and/or space-time block code the data based on one or more first control parameters. A second data transmission 2004 associated with a second user may allocate the encoded bits of the second data transmission 2004 to a plurality of interleavers (e.g., using one or more second RU-size based parsers after spatial stream parsing), QAM map, and/or space-time block code the data based on one or more second control parameters.

Figure 21:
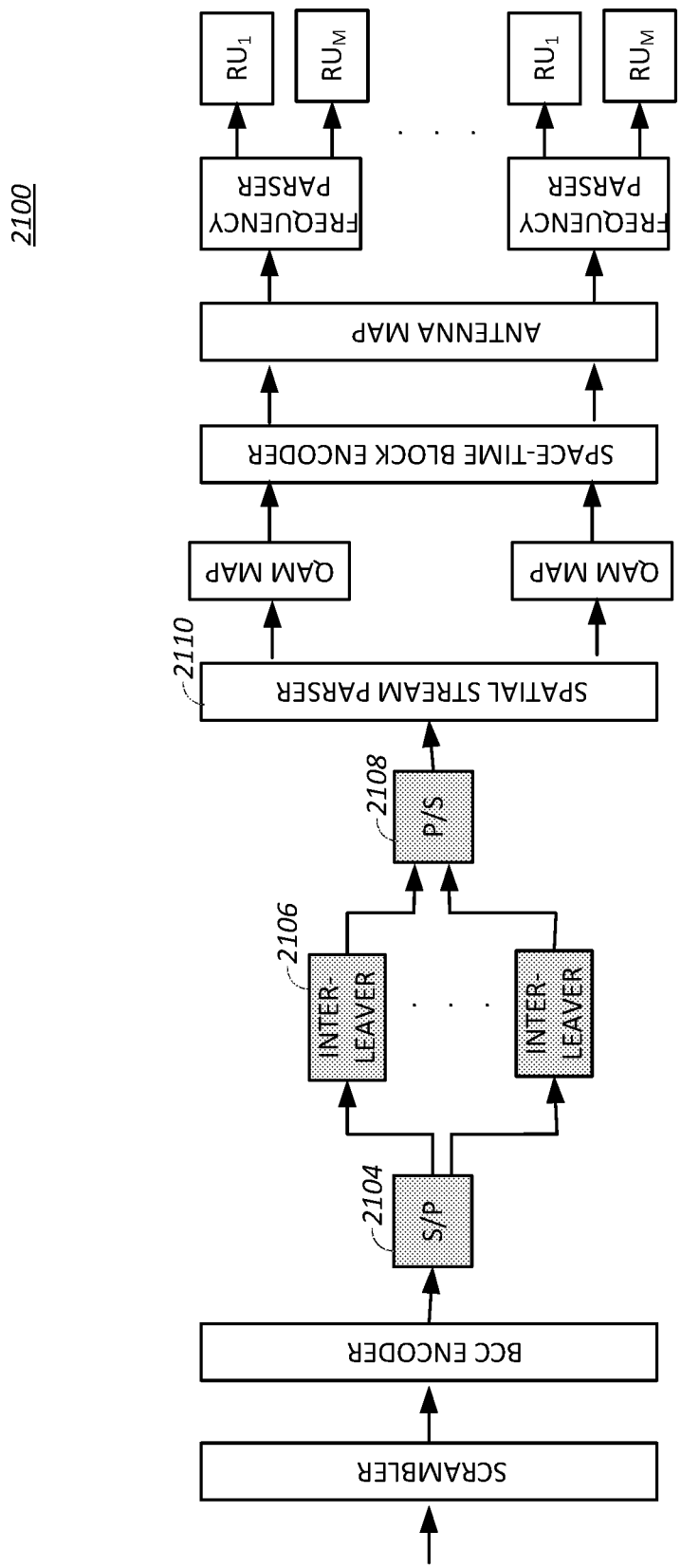
FIG. 21 is a diagram depicting an example transmitter with a single stream parallel block interleaver for a multiple RU allocation.

FIG. 21 is a diagram depicting an example transmitter 2100 with a single stream parallel block interleaver for multiple RU allocation. The bits for the spatial streams may be interleaved together. The example transmitter 2100 shown in FIG. 21 may comprise one or more of the following components: a serial-to-parallel multiplexer 2104, multiple interleavers 2106, and a parallel-to-serial de-multiplexer 2108. A spatial stream parser 2110 may be used after the interleavers 2106 and parallel-to-serial de-multiplexer 2108. The spatial stream parser 2110 may separate interleaved bits to different spatial streams. A space-time block encoder may be optional. For example, the space-time block encoder may be skipped in the transmission process depending on the mode of transmission.

At the transmitter, for each STA the interleaving and multiple RU allocation operations may include one or more of the following. An output of an encoder (e.g., a BCC encoder) may be sent to a serial-to-parallel multiplexer. The serial-to-parallel multiplexer may allocate one or more input bits to multiple parallel interleavers. The serial-to-parallel multiplexer may allocate the one or more input bits based on a pre-defined pattern. The number of interleavers may equal the number of RUs allocated for the transmission (e.g., the transmit user). An interleaver design may follow the design for a corresponding RU. The interleaver design may be modified. For example, the interleavers $N_{row}$ parameter may be modified as follows, $$N_{row\_ss} = N_{row} * N_{ss}$$

Each interleaver may interleave the one or more input encoded bits. For example, each interleaver may interleave the one or more input encoded bits using the interleaver design parameters shown in FIG. 6. The interleaver design may be based on code types other than BCC and LDPC. The output of the interleavers may be sent to a parallel-to-serial de-multiplexer. The parallel-to-serial de-multiplexer may combine the outputs of multiple interleavers into one bit stream. The parallel-to-serial de-multiplexer may combine the outputs based on a predefined pattern. The combined output stream from the parallel-to-serial de-multiplexer may be parsed into multiple spatial streams by a spatial stream parser. Each of the multiple spatial streams may be mapped to a constellation symbol by a QAM mapper (e.g., separately).

The output of the QAM mapper may be sent to a space-time block encoder. The output of the space-time block encoder may be sent to an antenna mapper. After space-time encoding and antenna mapping, the symbols may be sent to multiple RUs through a frequency parser. The receiver data flow may be the reverse of the transmitter data flow shown in FIG. 21.

Single stream parallel block interleaver for multiple equal-size RU allocation may be provided. The multiple interleavers for a transmission (e.g., a transmit user) may be identical and may follow the interleaver design shown in FIG. 6.

M contiguous and/or non-contiguous RUs with $N_{sd}$ data tones may be scheduled for a transmission (e.g., one user transmission). For each OFDMA symbol, the length of one or more input bits to the multiplexed parallel block interleaver may be represented as $MN_{sd}N_{BPSCS}N_{ss}$. The one or more input bits may be represented as $b = [b_0, b_1, \ldots, b_{L-1}]$. A serial-to-parallel multiplexer may allocate (e.g., uniformly allocate) the encoded bits to different interleavers. The serial-to-parallel multiplexer may allocate the encoded bits based on a pre-defined pattern. When the serial-to-parallel multiplexer performs a uniform allocation, the input of an interleaver m ($1 \leq m \leq M$) may be defined as follows:

$$x_{m,i} = b_{iM+m-1},$$

where $$i = 0, 1, \ldots, \frac{L}{M} - 1.$$

In each interleaver, the one or more input bits may be interleaved based on the interleaver design shown in FIG. 6. The output of the interleaver m ($1 \leq m \leq M$) may be represented as $$y_m = \left[ y_{m,1}, y_{m,2}, \ldots, y_{m,\frac{L}{M}-1} \right].$$

The outputs of the interleavers may be sent to a parallel-to-serial de-multiplexer. The parallel-to-serial de-multiplexer may combine the outputs of the interleavers to form one bit stream. The output of the parallel-to-serial de-multiplexer may be defined as follows:

$$z_l = y_{m,i}, l = 0, 1, \ldots, L-1, i = 0, 1, \ldots, \frac{L}{M} - 1$$

where $$l = (m-1)L/M + i$$

The outputs of the multiple interleavers may be combined into one sequence $z = [y_1, y_2, \ldots, y_M]$. The output of the parallel-to-serial de-multiplexer may be sent to a spatial stream parser. The spatial stream parser may separate bits into $L_{stream} = MN_{sd}N_{BPSCS}$ bits. The $L_{stream} = MN_{sd}N_{BPSCS}$ bits may be mapped to constellations. After an optional space-time encoding and/or antenna mapping, the symbols may be mapped (e.g., uniformly mapped) to the subcarriers of the RUs scheduled for the transmitting STA.

A single stream parallel block interleaver for multiple unequal-size RU allocation may be provided. The serial-to-parallel multiplexer and parallel-to-serial de-multiplexer designs may be modified (e.g., due to the unequal RU sizes).

M contiguous and/or non-contiguous RUs and $N_{ss}$ streams may be scheduled for a transmission (e.g., one user transmission). A RU may comprise $N_{sd}^m$ ($1 \leq m \leq M$) data tones. For each OFDMA symbol, the length of one or more input bits to the single stream parallel block interleaver may be defined as $L = \sum_{m=1}^{M} N_{sd}^m \times N_{BPSCS}N_{ss}$. The input bits may be represented as $b = [b_0, b_1, \ldots, b_{L-1}]$. The number of data tones may be defined as $N = \sum_{m=1}^{M} N_{sd}^m N_{ss}$. A serial-toparallel multiplexer may allocate the encoded bits to different interleavers. The greatest common divisor of $N_{sd}^m$ (m=1, 2, ..., M) may be represented as D, and $$C_m = \frac{N_{sd}^m}{N}.$$

The input of interleaver m (1≤m≤M) may be defined as follows:

$$x_{m,i} = b_l, i = 0, 1, \ldots, q_m - 1$$

where $$l = \left\lfloor \frac{i}{C_m} \right\rfloor \sum_{j=1}^{M} C_j + \sum_{j=1}^{m-1} C_j + i \bmod C_m$$

and $$q_m = \frac{N_{sd}^m N_{ss}}{N}, L = N_{sd}^m N_{BPSCS} N_{ss}$$

In each of the multiple interleavers, the one or more input bits may be interleaved based on the interleaver design shown in FIG. 6. The output of one of the multiple interleavers m (1≤m≤M) may be represented as $y_m = [y_{m,0}, y_{m,1}, \ldots, y_{m,q_m-1}]$. The outputs of the multiple interleavers may be sent to a parallel-to-serial de-multiplexer. The parallel-to-serial de-multiplexer may combine the outputs of the multiple interleavers to form one bit stream. The parallel-to-serial de-multiplexer may combing the outputs using different combining patterns (e.g., without loss of generality). The output of the parallel-to-serial de-multiplexer may be defined as follows:

$$z_l = y_{m,i}, l = 0, 1, \ldots, L-1, i = 0, 1, \ldots, q_m - 1$$

where $$l = \Sigma_{p=1}^{m-1} q_p + i$$

The outputs of the multiple interleavers may be combined into one sequence $z = [y_1, y_2, \ldots, y_M]$. The output of the parallel-to-serial de-multiplexer may be sent to a spatial stream parser. The spatial stream parser may separate bits for each spatial stream. The separated bits may be mapped to one or more constellations. After an optional space-time encoding and/or an optional antenna mapping, the symbols may be mapped (e.g., uniformly mapped) to the subcarriers of the RUs scheduled for the transmitting STA. The single stream parallel block interleaver for multiple unequal-size RU allocation may take advantage of spatial diversity.

Signaling and feedback for contiguous and/or non-contiguous multiple RU allocation may be provided. A scheduler may perform one or more scheduling operations.

Figure 22:
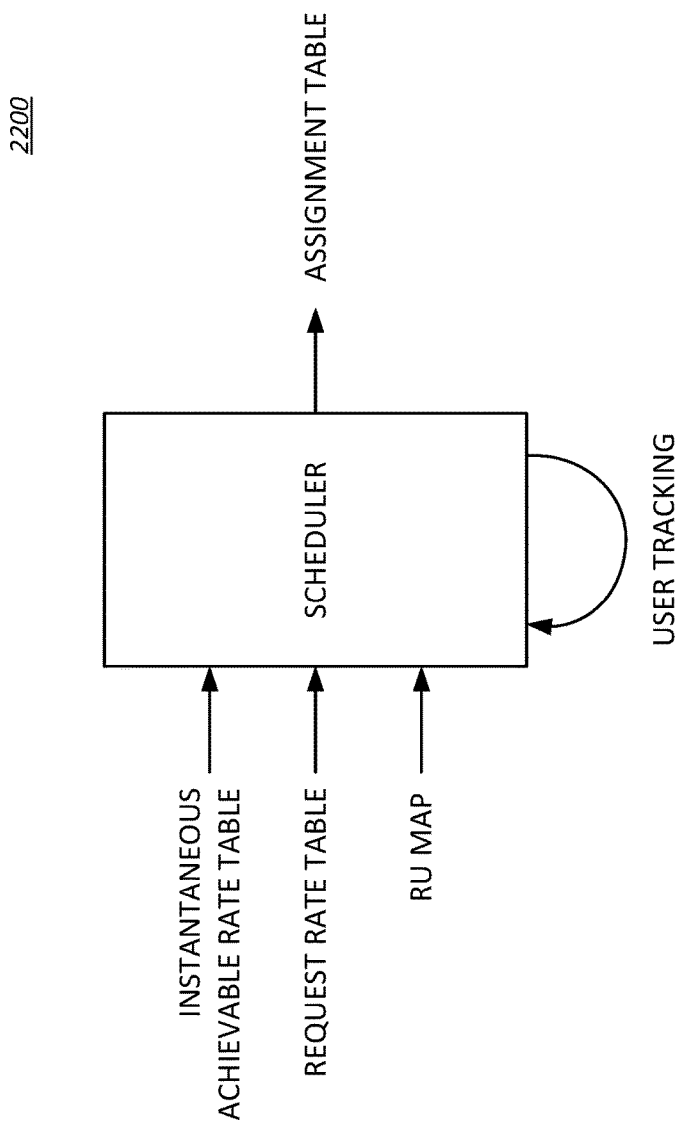
FIG. 22 is a diagram depicting input and output parameters of an example scheduler.

FIG. 22 is a diagram depicting an example scheduler 2200 with input and output parameters. The input parameters of a scheduling operation may include one or more of the following: an instantaneous achievable rate table, a RU map, or a rate request table. The input parameters may enable efficient scheduling operations. A module may track a user's rate. The module may be included in the scheduler. The module may prevent the users from starving for resources. The output of the scheduler may include an assignment table. The assignment table may indicate an association between one or more RUs and one or more users.

An instantaneous achievable rate table may comprise one or more entries (e.g., a plurality of entries). Each of the plurality of entries may indicate an instantaneous rate (e.g., if the user is assigned to a single RU or multiple RUs). The scheduler may maximize an objective function based on the instantaneous rate table and/or history associated with one or more users (e.g., an average rate). The instantaneous rate table may be generated based on feedback information (e.g., SINR). The instantaneous rate table may be generated based on a feedback granularity after some non-linear conversions (e.g., Shannon capacity formula) or linear conversions (e.g., the sum/average of instantaneous rates in multiple RUs or scaling based on the number of subcarriers in RUs). The feedback granularity may be defined as a granularity of one or more sub-channels each feedback element corresponds to. For example, a feedback granularity of 26 tones may indicate that each feedback SNR maps to a 26-tone resource unit.

The RU map may comprise a data structure. The RU map may indicate the adjacency of RUs. The RU map may guide the scheduler to track one or more constraints. One or more RUs configurations in the scheduler may require that the RU map be provided as an input. For example, a set of RUs scheduled to a user may include the OFDMA building blocks (e.g., the OFDMA building blocks defined in 802.11ax) due to its lower overhead (e.g., 18 OFDMA building blocks may be scheduled to a user for 20 MHz bandwidth.) The scheduler may determine that an assignment may narrow down the set possible RUs (e.g., drastically). The scheduler may determine that the assignment may result in an inefficient use of resources.

Figure 23:
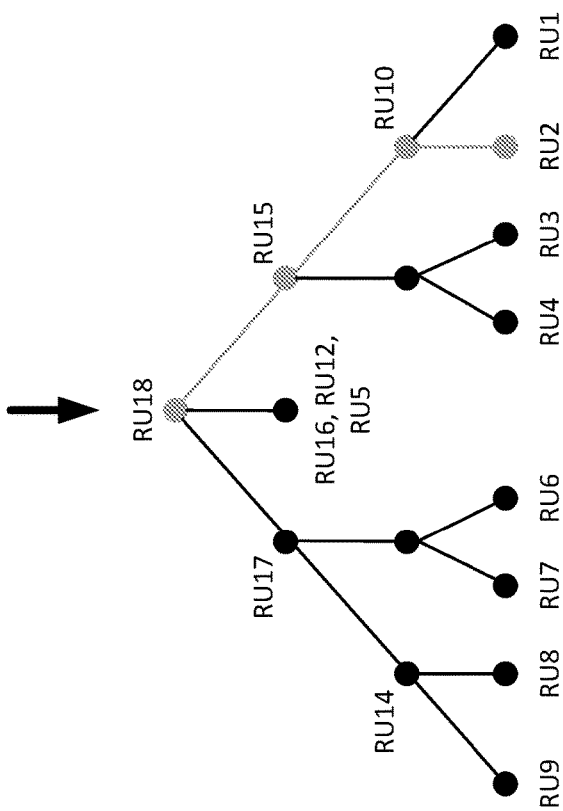
FIG. 23 is a diagram depicting an example tree structure of OFDMA building blocks.

FIG. 23 is a diagram depicting an example tree structure 2300 of OFDMA building blocks. As shown, when RU2 is assigned to a user, RU10, RU15, and RU18 may not be utilized for the others users in the current transmission. A data structure may find the blocked RUs due to an assignment. A data structure input to the scheduler may indicate the adjacency between RUs.

Figure 24:
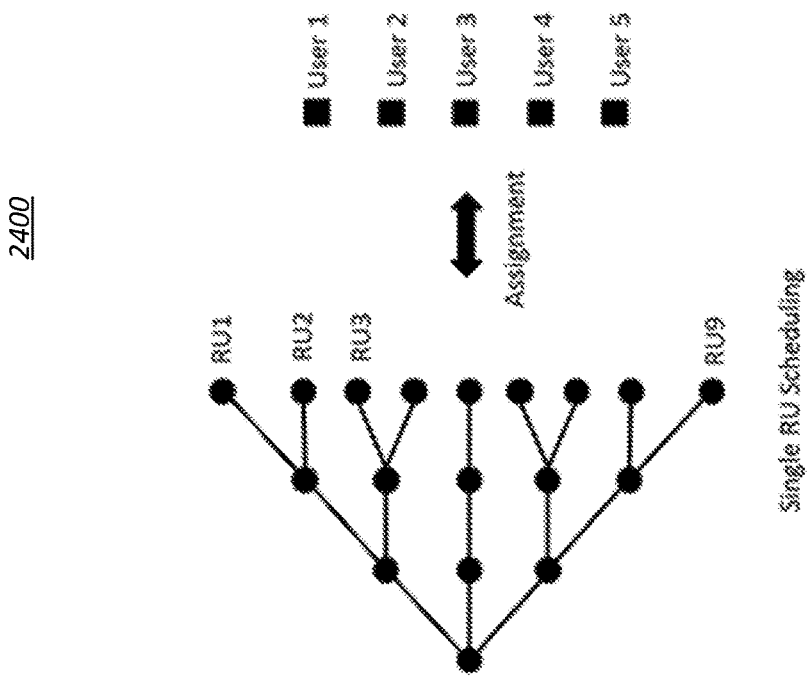
FIG. 24 is a diagram depicting an example tree structure of OFDMA building blocks.
Figure 24:
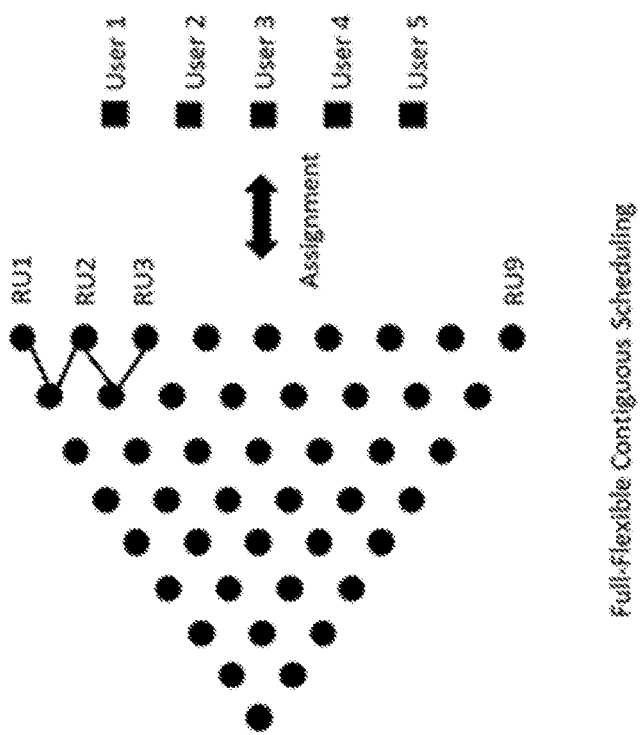

An RU map may be obtained in matrix-form. For example, in 802.11ax, OFDMA basic building blocks may be nodes of a tree structure as illustrated in FIG. 23. T∈ $\mathbb{R}^{16 \times 16}$ may define a matrix where the entry at nth row and mth column of T is denoted by $T_{n,m}$. The matrix may express the RU tree structure. The columns and rows of T may be labeled as {RU1, RU2, RU3, RU4, {RU5, RU12, RU16}, RU6, RU7, RU8, RU9, RU10, RU11, RU13, RU14, RU15, RU17, RU18} (e.g., in order). The RU tree structure may be defined as an adjacency matrix. For example, the RU tree structure may be defined as T where the entries of $T_{15,16}$, $T_{14,16}$, $T_{5,16}$, $T_{13,15}$, $T_{12,15}$, $T_{11,14}$, $T_{10,14}$, $T_{9,13}$, $T_{8,13}$, $T_{7,12}$, $T_{6,12}$, $T_{4,11}$, $T_{3,11}$, $T_{2,10}$, and $T_{1,10}$, are set to 1, otherwise 0. One or more of the following operation may be performed to find the blocked RUs, $$b_{down} = T^k a,$$

and $$b_{up} = T^{T^k} a,$$

where a may represent an assignment vector. The elements of the assignment vector may take their values from the set of {0,1}. The assignment vector may indicate if the RU is assigned or not (e.g., if a=[0 1 0 ... 0], the second RU may be assigned to a user). k may represent the order of the neighborhood of a node (e.g., the first order neighborhood of RU10 consists of RU1, RU2, and RU15 for the example shown in FIG. 23). $b_{up}$ and $b_{down}$ may represent neighborhood vectors. A neighborhood vector with one or more non-zero elements may indicate one or more blocked nodes at kth order neighborhood. $b_{up}$ may indicate one or more blocked nodes above a scheduled node. $b_{down}$ may indicate one or more blocked nodes below the scheduled node. FIG. 24 is a diagram depicting an example tree structure 2400 of OFDMA building blocks.

A request rate table may comprise one or more user priorities, classes and/or rates for each user. The rate request table may be determined based on information send from each STA. For example, each STA may send information on one or more priorities, one or more traffic classes and/or one or more minimum rates. Information sent by a STA may be traffic specific. Traffic specific information may be information sent when the STA has traffic to send. For example, traffic specific information may be sent in a traffic indication frame. The information sent by the STA may be set to a default value. The default value may be based on a user priority request/response frame exchange. An AP may determine a rate request table based on the last information sent by a STA.

For uplink traffic, the AP may send a traffic request poll frame to one or more (e.g., all) STAs in the BSS. A STA with traffic to send may respond to the traffic request with a traffic indicator frame. The traffic indicator frame may include information on a class of traffic, a traffic priority, a minimum rate required, and/or a minimum PER required. A STA may access an uplink OFDMA Random Access Channel (RACH) to send the traffic indicator frame.

For downlink traffic, the AP may determine (e.g., pre-negotiate) one or more general traffic parameters with the STA. The AP may determine (e.g., infer) one or more traffic parameters from the traffic itself. The AP may populate the rate request table based on the one or more traffic parameters.

A scheduler restriction in the RU map may determine the channel feedback type. The scheduler restriction may indicate a granularity needed by the AP from different STA receivers. For example, an AP may request channel feedback within specific bands based on a current RU map from multiple STAs that have indicated a desire to transmit information. In another example, an AP may request feedback over the entire transmission bandwidth but with a larger feedback granularity than usual based on the rate table and/or RU map. In another example, an AP may request STAs sending traffic requests to send (e.g., simultaneously send) channel feedback information for one or more available RUs.

An AP may request specific band or granularity for feedback. The AP may determine the channel feedback type and/or feedback granularity for each user based on a RU map. The feedback granularity may include multiple RUs, single RUs or band information. The feedback granularity may be determined based on vector $b_{down}$ and/or vector $b_{up}$. The AP may send a feedback-set frame to one or more corresponding STAs in the BSS. The feedback-set frame may include multiple users or a single user. One or more STAs may respond with an acknowledgement frame. The one or more STAs may respond with the feedback information.

The systems, methods, and instrumentalities described herein may apply in any combination, may apply to other wireless technologies, and for other services.

Although disclosed features, elements and techniques (e.g., disclosed technologies) are described in various examples with various combinations, each feature, element or technique may be implemented alone and in various combinations with and without other described features, elements and techniques.

Although examples are presented with respect to 802.11, the disclosed technologies may be applicable to other wireless systems and protocols.

Antenna mapping may be interchangeably used with spatial mapping.

Although disclosed features, elements and techniques (e.g., disclosed technologies) are presented with respect to supporting multiple RU allocation, the disclosed technologies are applicable to single RU allocation case when M is equal to 1.

A WTRU may refer to an identity of the physical device, or to the user's identity such as subscription related identities, e.g., MSISDN, SIP URI, etc. WTRU may refer to application-based identities, e.g., user names that may be used per application.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs). A processor in association with software may be used to implement a radio frequency transceiver for use in a WTRU, terminal, base station, RNC, and/or any host computer.

What is claimed:

1. A method for use in an access point (AP), the method comprising:
    parsing an encoded bit stream into a plurality of spatial streams;
    determining a configured size, in tones, of multiple resource units (RUs) for use in a transmission to a station (STA);
    allocating a number of encoded bits from each of the plurality of spatial streams to a plurality of interleavers based on the configured size of the multiple RUs and channel related feedback information, wherein each of the plurality of interleavers is associated with at least one RU of the multiple RUs;
    interleaving the number of allocated encoded bits using the plurality of interleavers; and
    transmitting the multiple RUs to the STA.

2. The method of claim 1, further comprising:
    determining one or more modulation and coding schemes (MCSs) for the multiple RUs; and
    mapping, based on the one or more determined MCSs, the encoded bits of the plurality of spatial streams to constellation points.

3. The method of claim 2, further comprising:
    determining a multiple input multiple output (MIMO) scheme for each RU of the multiple RUs;
    determining a space-time code based on the determined MIMO scheme for each RU;
    spreading, using the space-time code, the constellation points from the plurality of spatial streams into a plurality of space-time streams; and mapping the plurality of space-time streams to a plurality of transmit chains.

4. The method of claim 1, further comprising:
determining which RU of the multiple RUs should be used for each transmitting antenna; and
allocating, to the STA based on the RU determination, the encoded bits to one or more RUs of the multiple RUs.

5. The method of claim 1, wherein the encoded bit stream is parsed based on RU size.

6. The method of claim 1, wherein the multiple RUs are one or more of contiguous or non-contiguous with equal or unequal RU size.

7. The method of claim 1, wherein the allocation of the encoded bits is further determined based on one or more of an RU configuration associated with the transmission, a quality of service (QoS), or traffic priorities.

8. The method of claim 1, further comprising combining the interleaved encoded bits from the plurality of interleavers into a sequenced bit stream.

9. The method of claim 1, wherein the plurality of interleavers used is equal to an amount of the multiple RUs allocated for the transmission, and wherein each of the plurality of interleavers corresponds to a corresponding RU of the multiple RUs.

10. The method of claim 1, further comprising sending the transmission to the STA.

11. An access point (AP) comprising:
an antenna; and
a processor operatively coupled to the antenna, the processor configured to parse an encoded bit stream into a plurality of spatial streams;
the process further configured to determine a configure size, in tones, of multiple resource units (RUs) for use in a transmission to a station (STA);
the processor further configured to allocate a number of encoded bits from each of the plurality of spatial streams to a plurality of interleavers based on the configured size of the multiple RUs and channel related feedback information, wherein each of the plurality of interleavers is associated with at least one RU of the multiple RUs;
the processor further configured to interleave the encoded bits using the plurality of interleavers; and
the processor and the antenna configured to transmit the multiple RUs to the STA.

12. The AP of claim 11, further configured to:
determine one or more modulation and coding schemes (MCSs) for the multiple RUs; and
map, based on the one or more determined MCSs, the encoded bits of the plurality of spatial streams to constellation points.

13. The AP of claim 12, further configured to:
determine a multiple input multiple output (MIMO) scheme for each RU of the multiple RUs;
determine a space-time code based on the determined MIMO scheme for each RU;
spread, using the space-time code, the constellation points from the plurality of spatial streams into a plurality of space-time streams; and
mapping the plurality of space-time streams to a plurality of transmit chains.

14. The AP of claim 11, further configured to:
determine which RU of the multiple RUs should be used for each transmitting antenna; and
allocate, to the STA based on the RU determination, the encoded bits to one or more RUs of the multiple RUs.

15. The AP of claim 11, wherein the encoded bit stream is parsed based on RU size.

16. The AP of claim 11, wherein the multiple RUs are one or more of contiguous or non-contiguous with equal or unequal RU size.

17. The AP of claim 11, wherein the allocation of the encoded bits is further determined based on one or more of an RU configuration associated with the transmission, a quality of service (QoS), or traffic priorities.

18. The AP of claim 11, further configured to combine the interleaved encoded bits from the plurality of interleavers into a sequenced bit stream.

19. The AP of claim 11, wherein the plurality of interleavers used is equal to an amount of the multiple RUs allocated for the transmission, and wherein each of the plurality of interleavers corresponds to a corresponding RU of the multiple RUs.

20. The AP of claim 11, further configured to send the transmission to the STA.

* * * * *